Feb. 8, 1966 R. I. ROTH ETAL 3,234,369

SQUARE ROOT DEVICE EMPLOYING CONVERGING APPROXIMATIONS

Filed Dec. 13, 1961 16 Sheets-Sheet 1

INVENTORS
ROBERT I. ROTH
HAROLD FLEISHER

BY Francis J. Thomas
ATTORNEY

FIG. 3a

CRYOTRONS

| ADDEND | | GROUP 56 | | | | GROUP 58 | | | GROUP 60 | | | | GROUP 62 | | | | | | GROUP 64 | | | |
|---|---|---|---|---|---|---|---|---|---|---|---|---|---|---|---|---|---|---|---|---|---|---|
| 1 | 2 | -1 | -2 | -3 | -4 | -1 | -2 | -3 | -1 | -2 | -3 | -4 | -1 | -2 | -3 | -4 | -5 | -6 | -1 | -2 | -3 | -4 |
| 0000 | 000 | × | ✓ | × | | ✓ | | × | × | ✓ | × | | ✓ | | | × | × | × | ✓ | ✓ | | × |
| | 001 | ✓ | × | | × | ✓ | × | | × | ✓ | × | | ✓ | | | × | × | × | ✓ | ✓ | | × |
| | 010 | × | ✓ | × | | ✓ | | × | ✓ | × | | × | | ✓ | | × | × | × | ✓ | ✓ | × | |
| | 011 | ✓ | × | | × | ✓ | × | | ✓ | × | | × | | ✓ | | × | × | × | ✓ | ✓ | × | |
| | 100 | × | ✓ | × | | ✓ | | × | × | ✓ | × | | ✓ | | | × | × | × | ✓ | ✓ | | × |
| | 101 | ✓ | × | | × | ✓ | × | | × | ✓ | × | | ✓ | | | × | × | × | ✓ | ✓ | | × |
| | 110 | × | ✓ | × | | ✓ | | × | ✓ | × | | × | | ✓ | | × | × | × | ✓ | ✓ | × | |
| | 111 | ✓ | × | | × | ✓ | × | | ✓ | × | | × | | ✓ | | × | × | × | ✓ | ✓ | × | |
| 0001 | 000 | × | | × | ✓ | ✓ | × | | × | ✓ | × | | ✓ | | | × | × | × | ✓ | ✓ | | × |
| | 001 | | × | ✓ | × | × | ✓ | ✓ | × | ✓ | × | | × | × | × | ✓ | | | ✓ | ✓ | × | |
| | 010 | × | | × | ✓ | ✓ | × | | ✓ | × | | × | | ✓ | | × | × | × | ✓ | ✓ | × | |
| | 011 | | × | ✓ | × | × | ✓ | ✓ | ✓ | × | | × | × | × | × | | ✓ | | | × | ✓ | ✓ |
| | 100 | × | | × | ✓ | ✓ | × | | × | ✓ | × | | ✓ | | | × | × | × | ✓ | ✓ | | × |
| | 101 | | × | ✓ | × | × | ✓ | ✓ | × | ✓ | × | | × | × | × | ✓ | | | ✓ | ✓ | × | |
| | 110 | × | | × | ✓ | ✓ | × | | ✓ | × | | × | | ✓ | | × | × | × | ✓ | ✓ | × | |
| | 111 | | × | ✓ | × | × | ✓ | ✓ | ✓ | × | | × | × | × | × | | ✓ | | | × | ✓ | ✓ |
| 0010 | 000 | × | ✓ | × | | ✓ | | × | × | | × | ✓ | | ✓ | | × | × | × | ✓ | ✓ | × | |
| | 001 | ✓ | × | | × | ✓ | × | | × | | × | ✓ | | ✓ | | × | × | × | ✓ | ✓ | × | |
| | 010 | × | ✓ | × | | ✓ | | × | | × | ✓ | × | | | ✓ | × | × | × | | × | ✓ | ✓ |
| | 011 | ✓ | × | | × | ✓ | × | | | × | ✓ | × | | | ✓ | × | × | × | | × | ✓ | ✓ |
| | 100 | × | ✓ | × | | ✓ | | × | × | | × | ✓ | | ✓ | | × | × | × | ✓ | ✓ | × | |
| | 101 | ✓ | × | | × | ✓ | × | | × | | × | ✓ | | ✓ | | × | × | × | ✓ | ✓ | × | |
| | 110 | × | ✓ | × | | ✓ | | × | | × | ✓ | × | | | ✓ | × | × | × | | × | ✓ | ✓ |
| | 111 | ✓ | × | | × | ✓ | × | | | × | ✓ | × | | | ✓ | × | × | × | | × | ✓ | ✓ |
| 0011 | 000 | × | | × | ✓ | ✓ | × | | × | | × | ✓ | | ✓ | | × | × | × | ✓ | ✓ | × | |
| | 001 | | × | ✓ | × | × | ✓ | ✓ | × | | × | ✓ | × | × | × | | ✓ | | | × | ✓ | ✓ |
| | 010 | × | | × | ✓ | ✓ | × | | | × | ✓ | × | | | ✓ | × | × | × | | × | ✓ | ✓ |
| | 011 | | × | ✓ | × | × | ✓ | ✓ | | × | ✓ | × | × | × | × | | | ✓ | × | | ✓ | ✓ |
| | 100 | × | | × | ✓ | ✓ | × | | × | | × | ✓ | | ✓ | | × | × | × | ✓ | ✓ | × | |
| | 101 | | × | ✓ | × | × | ✓ | ✓ | × | | × | ✓ | × | × | × | | ✓ | | | × | ✓ | ✓ |
| | 110 | × | | × | ✓ | ✓ | × | | | × | ✓ | × | | | ✓ | × | × | × | | × | ✓ | ✓ |
| | 111 | | × | ✓ | × | × | ✓ | ✓ | | × | ✓ | × | × | × | × | | | ✓ | × | | ✓ | ✓ |
| 0100 | 000 | × | ✓ | × | | ✓ | | × | × | ✓ | × | | ✓ | | | × | × | × | ✓ | ✓ | | × |
| | 001 | ✓ | × | | × | ✓ | × | | × | ✓ | × | | ✓ | | | × | × | × | ✓ | ✓ | | × |
| | 010 | × | ✓ | × | | ✓ | | × | ✓ | × | | × | | ✓ | | × | × | × | ✓ | ✓ | × | |
| | 011 | ✓ | × | | × | ✓ | × | | ✓ | × | | × | | ✓ | | × | × | × | ✓ | ✓ | × | |
| | 100 | × | ✓ | × | | ✓ | | × | × | ✓ | × | | ✓ | | | × | × | × | ✓ | ✓ | | × |
| | 101 | ✓ | × | | × | ✓ | × | | × | ✓ | × | | ✓ | | | × | × | × | ✓ | ✓ | | × |
| | 110 | × | ✓ | × | | ✓ | | × | ✓ | × | | × | | ✓ | | × | × | × | ✓ | ✓ | × | |
| | 111 | ✓ | × | | × | ✓ | × | | ✓ | × | | × | | ✓ | | × | × | × | ✓ | ✓ | × | |

| | |
|---|---|
| FIG 3a | FIG 3b |
| FIG 3c | FIG 3d |
| FIG 3e | FIG 3f |

FIG. 3

CRYOTRONS

| GROUP 66 | | | | GROUP 68 | | | | | | GROUP 70 | | | | GROUP 72 | | | | GROUP 74 | | | GROUP 76 | | |
|---|---|---|---|---|---|---|---|---|---|---|---|---|---|---|---|---|---|---|---|---|---|---|---|
| -1 | -2 | -3 | -4 | -1 | -2 | -3 | -4 | -5 | -6 | -1 | -2 | -3 | -4 | -1 | -2 | -3 | -4 | -1 | -2 | -3 | -1 | -2 | SUM |
| × | ✓ | × | | ✓ | | | × | × | × | ✓ | ✓ | | × | × | ✓ | × | | ✓ | | × | × | ✓ | 00000 |
| × | ✓ | × | | ✓ | | | × | × | × | ✓ | ✓ | | × | × | ✓ | × | | ✓ | | × | × | ✓ | 00001 |
| × | ✓ | × | | ✓ | | | × | × | × | ✓ | ✓ | | × | × | ✓ | × | | ✓ | | × | × | ✓ | 00010 |
| × | ✓ | × | | ✓ | | | × | × | × | ✓ | ✓ | | × | × | ✓ | × | | ✓ | | × | × | ✓ | 00011 |
| ✓ | × | | × | | ✓ | | × | × | × | ✓ | ✓ | × | | × | ✓ | × | | ✓ | | × | × | ✓ | 00100 |
| ✓ | × | | × | | ✓ | | × | × | × | ✓ | ✓ | × | | × | ✓ | × | | ✓ | | × | × | ✓ | 00101 |
| ✓ | × | | × | | ✓ | | × | × | × | ✓ | ✓ | × | | × | ✓ | × | | ✓ | | × | × | ✓ | 00110 |
| ✓ | × | | × | | ✓ | | × | × | × | ✓ | ✓ | × | | × | ✓ | × | | ✓ | | × | × | ✓ | 00111 |
| × | ✓ | × | | ✓ | | | × | × | × | ✓ | ✓ | | × | × | ✓ | × | | ✓ | | × | × | ✓ | 00001 |
| × | ✓ | × | | ✓ | | | × | × | × | ✓ | ✓ | | × | × | ✓ | × | | ✓ | | × | × | ✓ | 00010 |
| × | ✓ | × | | ✓ | | | × | × | × | ✓ | ✓ | | × | × | ✓ | × | | ✓ | | × | × | ✓ | 00011 |
| × | ✓ | × | | × | × | × | ✓ | | | ✓ | ✓ | × | | × | ✓ | × | | ✓ | | × | × | ✓ | 00100 |
| ✓ | × | | × | | ✓ | | × | × | × | ✓ | ✓ | × | | × | ✓ | × | | ✓ | | × | × | ✓ | 00101 |
| ✓ | × | | × | | ✓ | | × | × | × | ✓ | ✓ | × | | × | ✓ | × | | ✓ | | × | × | ✓ | 00110 |
| ✓ | × | | × | | ✓ | | × | × | × | ✓ | ✓ | × | | × | ✓ | × | | ✓ | | × | × | ✓ | 00111 |
| ✓ | × | | × | × | × | × | | ✓ | | | × | ✓ | ✓ | ✓ | × | | × | ✓ | × | | × | ✓ | 01000 |
| × | ✓ | × | | ✓ | | | × | × | × | ✓ | ✓ | | × | × | ✓ | × | | ✓ | | × | × | ✓ | 00010 |
| × | ✓ | × | | ✓ | | | × | × | × | ✓ | ✓ | | × | × | ✓ | × | | ✓ | | × | × | ✓ | 00011 |
| × | ✓ | × | | × | × | × | ✓ | | | ✓ | ✓ | × | | × | ✓ | × | | ✓ | | × | × | ✓ | 00100 |
| × | ✓ | × | | × | × | × | ✓ | | | ✓ | ✓ | × | | × | ✓ | × | | ✓ | | × | × | ✓ | 00101 |
| ✓ | × | | × | | ✓ | | × | × | × | ✓ | ✓ | × | | × | ✓ | × | | ✓ | | × | × | ✓ | 00110 |
| ✓ | × | | × | | ✓ | | × | × | × | ✓ | ✓ | × | | × | ✓ | × | | ✓ | | × | × | ✓ | 00111 |
| ✓ | × | | × | × | × | × | | ✓ | | | × | ✓ | ✓ | ✓ | × | | × | ✓ | × | | × | ✓ | 01000 |
| ✓ | × | | × | × | × | × | | ✓ | | | × | ✓ | ✓ | ✓ | × | | × | ✓ | × | | × | ✓ | 01001 |
| × | ✓ | × | | ✓ | | | × | × | × | ✓ | ✓ | | × | × | ✓ | × | | ✓ | | × | × | ✓ | 00011 |
| × | ✓ | × | | × | × | × | ✓ | | | ✓ | ✓ | × | | × | ✓ | × | | ✓ | | × | × | ✓ | 00100 |
| × | ✓ | × | | × | × | × | ✓ | | | ✓ | ✓ | × | | × | ✓ | × | | ✓ | | × | × | ✓ | 00101 |
| × | ✓ | × | | × | × | × | ✓ | | | ✓ | ✓ | × | | × | ✓ | × | | ✓ | | × | × | ✓ | 00110 |
| ✓ | × | | × | | ✓ | | × | × | × | ✓ | ✓ | × | | × | ✓ | × | | ✓ | | × | × | ✓ | 00111 |
| ✓ | × | | × | × | × | × | | ✓ | | | × | ✓ | ✓ | ✓ | × | | × | ✓ | × | | × | ✓ | 01000 |
| ✓ | × | | × | × | × | × | | ✓ | | | × | ✓ | ✓ | ✓ | × | | × | ✓ | × | | × | ✓ | 01001 |
| ✓ | × | | × | × | × | × | | ✓ | | | × | ✓ | ✓ | ✓ | × | | × | ✓ | × | | × | ✓ | 01010 |
| × | | × | ✓ | | ✓ | | × | × | × | ✓ | ✓ | × | | × | ✓ | × | | ✓ | | × | × | ✓ | 00100 |
| × | | × | ✓ | | ✓ | | × | × | × | ✓ | ✓ | × | | × | ✓ | × | | ✓ | | × | × | ✓ | 00101 |
| × | | × | ✓ | | ✓ | | × | × | × | ✓ | ✓ | × | | × | ✓ | × | | ✓ | | × | × | ✓ | 00110 |
| × | | × | ✓ | | ✓ | | × | × | × | ✓ | ✓ | × | | × | ✓ | × | | ✓ | | × | × | ✓ | 00111 |
| | × | ✓ | × | | | ✓ | × | × | × | | × | ✓ | ✓ | ✓ | × | | × | ✓ | × | | × | ✓ | 01000 |
| | × | ✓ | × | | | ✓ | × | × | × | | × | ✓ | ✓ | ✓ | × | | × | ✓ | × | | × | ✓ | 01001 |
| | × | ✓ | × | | | ✓ | × | × | × | | × | ✓ | ✓ | ✓ | × | | × | ✓ | × | | × | ✓ | 01010 |
| | × | ✓ | × | | | ✓ | × | × | × | | × | ✓ | ✓ | ✓ | × | | × | ✓ | × | | × | ✓ | 01011 |

FIG. 3b

| | | | | | | | | | | | | | | | | | | | | | | | |
|---|---|---|---|---|---|---|---|---|---|---|---|---|---|---|---|---|---|---|---|---|---|---|---|
| × | | × | ✓ | | ✓ | | × | × | × | ✓ | ✓ | × | | × | ✓ | × | | ✓ | | × | × | ✓ | 00101 |
| × | | × | ✓ | | ✓ | | × | × | × | ✓ | ✓ | × | | × | ✓ | × | | ✓ | | × | × | ✓ | 00110 |
| × | | × | ✓ | | ✓ | | × | × | × | ✓ | ✓ | × | | × | ✓ | × | | ✓ | | × | × | ✓ | 00111 |
| × | | × | ✓ | × | × | × | | ✓ | | | × | ✓ | ✓ | ✓ | × | | × | ✓ | × | | × | ✓ | 01000 |
| | × | ✓ | × | | | ✓ | × | × | × | | × | ✓ | ✓ | ✓ | × | | × | ✓ | × | | × | ✓ | 01001 |
| | × | ✓ | × | | | ✓ | × | × | × | | × | ✓ | ✓ | ✓ | × | | × | ✓ | × | | × | ✓ | 01010 |
| | × | ✓ | × | | | ✓ | × | × | × | | × | ✓ | ✓ | ✓ | × | | × | ✓ | × | | × | ✓ | 01011 |
| | × | ✓ | × | × | × | × | | | ✓ | × | | ✓ | ✓ | ✓ | × | | × | ✓ | × | | × | ✓ | 01100 |
| × | | × | ✓ | | ✓ | | × | × | × | ✓ | ✓ | × | | × | ✓ | × | | ✓ | | × | × | ✓ | 00110 |
| × | | × | ✓ | | ✓ | | × | × | × | ✓ | ✓ | × | | × | ✓ | × | | ✓ | | × | × | ✓ | 00111 |
| × | | × | ✓ | × | × | × | | ✓ | | | × | ✓ | ✓ | ✓ | × | | × | ✓ | × | | × | ✓ | 01000 |
| × | | × | ✓ | × | × | × | | ✓ | | | × | ✓ | ✓ | ✓ | × | | × | ✓ | × | | × | ✓ | 01001 |
| | × | ✓ | × | | | ✓ | × | × | × | | × | ✓ | ✓ | ✓ | × | | × | ✓ | × | | × | ✓ | 01010 |
| | × | ✓ | × | | | ✓ | × | × | × | | × | ✓ | ✓ | ✓ | × | | × | ✓ | × | | × | ✓ | 01011 |
| | × | ✓ | × | × | × | × | | | ✓ | × | | ✓ | ✓ | ✓ | × | | × | ✓ | × | | × | ✓ | 01100 |
| | × | ✓ | × | × | × | × | | | ✓ | × | | ✓ | ✓ | ✓ | × | | × | ✓ | × | | × | ✓ | 01101 |
| × | | × | ✓ | | ✓ | | × | × | × | ✓ | ✓ | × | | × | ✓ | × | | ✓ | | × | × | ✓ | 00111 |
| × | | × | ✓ | × | × | × | | ✓ | | | × | ✓ | ✓ | ✓ | × | | × | ✓ | × | | × | ✓ | 01000 |
| × | | × | ✓ | × | × | × | | ✓ | | | × | ✓ | ✓ | ✓ | × | | × | ✓ | × | | × | ✓ | 01001 |
| × | | × | ✓ | × | × | × | | ✓ | | | × | ✓ | ✓ | ✓ | × | | × | ✓ | × | | × | ✓ | 01010 |
| | × | ✓ | × | | | ✓ | × | × | × | | × | ✓ | ✓ | ✓ | × | | × | ✓ | × | | × | ✓ | 01011 |
| | × | ✓ | × | × | × | × | | | ✓ | × | | ✓ | ✓ | ✓ | × | | × | ✓ | × | | × | ✓ | 01100 |
| | × | ✓ | × | × | × | × | | | ✓ | × | | ✓ | ✓ | ✓ | × | | × | ✓ | × | | × | ✓ | 01101 |
| | × | ✓ | × | × | × | × | | | ✓ | × | | ✓ | ✓ | ✓ | × | | × | ✓ | × | | × | ✓ | 01110 |
| × | ✓ | × | | ✓ | | | × | × | × | ✓ | ✓ | | × | × | | × | ✓ | ✓ | × | | × | ✓ | 01000 |
| × | ✓ | × | | ✓ | | | × | × | × | ✓ | ✓ | | × | × | | × | ✓ | ✓ | × | | × | ✓ | 01001 |
| × | ✓ | × | | ✓ | | | × | × | × | ✓ | ✓ | | × | × | | × | ✓ | ✓ | × | | × | ✓ | 01010 |
| × | ✓ | × | | ✓ | | | × | × | × | ✓ | ✓ | | × | × | | × | ✓ | ✓ | × | | × | ✓ | 01011 |
| ✓ | × | | × | | ✓ | | × | × | × | ✓ | ✓ | × | | × | | × | ✓ | ✓ | × | | × | ✓ | 01100 |
| ✓ | × | | × | | ✓ | | × | × | × | ✓ | ✓ | × | | × | | × | ✓ | ✓ | × | | × | ✓ | 01101 |
| ✓ | × | | × | | ✓ | | × | × | × | ✓ | ✓ | × | | × | | × | ✓ | ✓ | × | | × | ✓ | 01110 |
| ✓ | × | | × | | ✓ | | × | × | × | ✓ | ✓ | × | | × | | × | ✓ | ✓ | × | | × | ✓ | 01111 |
| × | ✓ | × | | ✓ | | | × | × | × | ✓ | ✓ | | × | × | | × | ✓ | ✓ | × | | × | ✓ | 01001 |
| × | ✓ | × | | ✓ | | | × | × | × | ✓ | ✓ | | × | × | | × | ✓ | ✓ | × | | × | ✓ | 01010 |
| × | ✓ | × | | ✓ | | | × | × | × | ✓ | ✓ | | × | × | | × | ✓ | ✓ | × | | × | ✓ | 01011 |
| × | ✓ | × | | × | × | × | ✓ | | | ✓ | ✓ | × | | × | | × | ✓ | ✓ | × | | × | ✓ | 01100 |
| ✓ | × | | × | | ✓ | | × | × | × | ✓ | ✓ | × | | × | | × | ✓ | ✓ | × | | × | ✓ | 01101 |
| ✓ | × | | × | | ✓ | | × | × | × | ✓ | ✓ | × | | × | | × | ✓ | ✓ | × | | × | ✓ | 01110 |
| ✓ | × | | × | | ✓ | | × | × | × | ✓ | ✓ | × | | × | | × | ✓ | ✓ | × | | × | ✓ | 01111 |
| ✓ | × | | × | × | × | × | | ✓ | | | × | ✓ | ✓ | | × | ✓ | × | × | ✓ | ✓ | ✓ | × | 10000 |
| × | ✓ | × | | ✓ | | | × | × | × | ✓ | ✓ | | × | × | | × | ✓ | ✓ | × | | × | ✓ | 01010 |
| × | ✓ | × | | ✓ | | | × | × | × | ✓ | ✓ | | × | × | | × | ✓ | ✓ | × | | × | ✓ | 01011 |
| × | ✓ | × | | × | × | × | ✓ | | | ✓ | ✓ | × | | × | | × | ✓ | ✓ | × | | × | ✓ | 01100 |
| × | ✓ | × | | × | × | × | ✓ | | | ✓ | ✓ | × | | × | | × | ✓ | ✓ | × | | × | ✓ | 01101 |

FIG. 3d

FIG. 3e

| | | | | | | | | | | | | | | | | | | | | | | |
|---|---|---|---|---|---|---|---|---|---|---|---|---|---|---|---|---|---|---|---|---|---|---|
| 1010 | 100 | × | ✓ | × | | ✓ | | × | × | | × | ✓ | | ✓ | | × | × | × | ✓ | ✓ | × | |
| | 101 | ✓ | × | | × | ✓ | × | | × | | × | ✓ | | ✓ | | × | × | × | ✓ | ✓ | × | |
| | 110 | × | ✓ | × | | ✓ | | × | | × | ✓ | × | | | ✓ | × | × | × | | × | ✓ | ✓ |
| | 111 | ✓ | × | | × | ✓ | × | | | × | ✓ | × | | | ✓ | × | × | × | | × | ✓ | ✓ |
| 1011 | 000 | × | | × | ✓ | ✓ | × | | × | | × | ✓ | | ✓ | | × | × | × | ✓ | ✓ | × | |
| | 001 | | × | ✓ | × | × | ✓ | ✓ | × | | × | ✓ | × | × | × | | ✓ | | | × | ✓ | ✓ |
| | 010 | × | | × | ✓ | ✓ | × | | | × | ✓ | × | | | ✓ | × | × | × | | × | ✓ | ✓ |
| | 011 | | × | ✓ | × | × | ✓ | ✓ | | × | ✓ | × | × | × | × | | | ✓ | × | | ✓ | ✓ |
| | 100 | × | | × | ✓ | ✓ | × | | × | | × | ✓ | | ✓ | | × | × | × | ✓ | ✓ | × | |
| | 101 | | × | ✓ | × | × | ✓ | ✓ | × | | × | ✓ | × | × | × | | ✓ | | | × | ✓ | ✓ |
| | 110 | × | | × | ✓ | ✓ | × | | | × | ✓ | × | | | ✓ | × | × | × | | × | ✓ | ✓ |
| | 111 | | × | ✓ | × | × | ✓ | ✓ | | × | ✓ | × | × | × | × | | | ✓ | × | | ✓ | ✓ |
| 1100 | 000 | × | ✓ | × | | ✓ | | × | × | ✓ | × | | ✓ | | | × | × | × | ✓ | ✓ | | × |
| | 001 | ✓ | × | | × | ✓ | × | | × | ✓ | × | | ✓ | | | × | × | × | ✓ | ✓ | | × |
| | 010 | × | ✓ | × | | ✓ | | × | ✓ | × | | × | | ✓ | | × | × | × | ✓ | ✓ | × | |
| | 011 | ✓ | × | | × | ✓ | × | | ✓ | × | | × | | ✓ | | × | × | × | ✓ | ✓ | × | |
| | 100 | × | ✓ | × | | ✓ | | × | × | ✓ | × | | ✓ | | | × | × | × | ✓ | ✓ | | × |
| | 101 | ✓ | × | | × | ✓ | × | | × | ✓ | × | | ✓ | | | × | × | × | ✓ | ✓ | | × |
| | 110 | × | ✓ | × | | ✓ | | × | ✓ | × | | × | | ✓ | | × | × | × | ✓ | ✓ | × | |
| | 111 | ✓ | × | | × | ✓ | × | | ✓ | × | | × | | ✓ | | × | × | × | ✓ | ✓ | × | |
| 1101 | 000 | × | | × | ✓ | ✓ | × | | × | ✓ | × | | ✓ | | | × | × | × | ✓ | ✓ | | × |
| | 001 | | × | ✓ | × | × | ✓ | ✓ | × | ✓ | × | | × | × | × | ✓ | | | ✓ | ✓ | × | |
| | 010 | × | | × | ✓ | ✓ | × | | ✓ | × | | × | | ✓ | | × | × | × | ✓ | ✓ | × | |
| | 011 | | × | ✓ | × | × | ✓ | ✓ | ✓ | × | | × | × | × | × | | ✓ | | | × | ✓ | ✓ |
| | 100 | × | | × | ✓ | ✓ | × | | × | ✓ | × | | ✓ | | | × | × | × | ✓ | ✓ | | × |
| | 101 | | × | ✓ | × | × | ✓ | ✓ | × | ✓ | × | | × | × | × | ✓ | | | ✓ | ✓ | × | |
| | 110 | × | | × | ✓ | ✓ | × | | ✓ | × | | × | | ✓ | | × | × | × | ✓ | ✓ | × | |
| | 111 | | × | ✓ | × | × | ✓ | ✓ | ✓ | × | | × | × | × | × | | ✓ | | | × | ✓ | ✓ |
| 1110 | 000 | × | ✓ | × | | ✓ | | × | × | | × | ✓ | | ✓ | | × | × | × | ✓ | ✓ | × | |
| | 001 | ✓ | × | | × | ✓ | × | | × | | × | ✓ | | ✓ | | × | × | × | ✓ | ✓ | × | |
| | 010 | × | ✓ | × | | ✓ | | × | | × | ✓ | × | | | ✓ | × | × | × | | × | ✓ | ✓ |
| | 011 | ✓ | × | | × | ✓ | × | | | × | ✓ | × | | | ✓ | × | × | × | | × | ✓ | ✓ |
| | 100 | × | ✓ | × | | ✓ | | × | × | | × | ✓ | | ✓ | | × | × | × | ✓ | ✓ | × | |
| | 101 | ✓ | × | | × | ✓ | × | | × | | × | ✓ | | ✓ | | × | × | × | ✓ | ✓ | × | |
| | 110 | × | ✓ | × | | ✓ | | × | | × | ✓ | × | | | ✓ | × | × | × | | × | ✓ | ✓ |
| | 111 | ✓ | × | | × | ✓ | × | | | × | ✓ | × | | | ✓ | × | × | × | | × | ✓ | ✓ |
| 1111 | 000 | × | | × | ✓ | ✓ | × | | × | | × | ✓ | | ✓ | | × | × | × | ✓ | ✓ | × | |
| | 001 | | × | ✓ | × | × | ✓ | ✓ | × | | × | ✓ | × | × | × | | ✓ | | | × | ✓ | ✓ |
| | 010 | × | | × | ✓ | ✓ | × | | | × | ✓ | × | | | ✓ | × | × | × | | × | ✓ | ✓ |
| | 011 | | × | ✓ | × | × | ✓ | ✓ | | × | ✓ | × | × | × | × | | | ✓ | × | | ✓ | ✓ |
| | 100 | × | | × | ✓ | ✓ | × | | × | | × | ✓ | | ✓ | | × | × | × | ✓ | ✓ | | × |
| | 101 | | × | ✓ | × | × | ✓ | ✓ | × | | × | ✓ | × | × | × | | ✓ | | ✓ | ✓ | | × |
| | 110 | × | | × | ✓ | ✓ | × | | | × | ✓ | × | | | ✓ | × | × | × | ✓ | ✓ | × | |
| | 111 | | × | ✓ | × | × | ✓ | ✓ | | × | ✓ | × | × | × | × | | | ✓ | ✓ | ✓ | × | |

SQUARE ROOT DEVICE EMPLOYING CONVERGING APPROXIMATIONS

| | | | | | | | | | | | | | | | | | | | | | | | |
|---|---|---|---|---|---|---|---|---|---|---|---|---|---|---|---|---|---|---|---|---|---|---|---|
| ✓ | × | | × | | ✓ | | × | × | × | ✓ | ✓ | × | | × | | × | ✓ | ✓ | × | | × | ✓ | 01110 |
| ✓ | × | | × | | ✓ | | × | × | × | ✓ | ✓ | × | | × | | × | ✓ | ✓ | × | | × | ✓ | 01111 |
| ✓ | × | | × | × | × | × | | ✓ | | | × | ✓ | ✓ | | × | ✓ | × | × | ✓ | ✓ | ✓ | × | 10000 |
| ✓ | × | | × | × | × | × | | ✓ | | | × | ✓ | ✓ | | × | ✓ | × | × | ✓ | ✓ | ✓ | × | 10001 |
| × | ✓ | × | | ✓ | | | × | × | × | ✓ | ✓ | | × | × | | × | ✓ | ✓ | × | | × | ✓ | 01011 |
| × | ✓ | × | | × | × | × | ✓ | | | ✓ | ✓ | × | | × | | × | ✓ | ✓ | × | | × | ✓ | 01100 |
| × | ✓ | × | | × | × | × | ✓ | | | ✓ | ✓ | × | | × | | × | ✓ | ✓ | × | | × | ✓ | 01101 |
| × | ✓ | × | | × | × | × | ✓ | | | ✓ | ✓ | × | | × | | × | ✓ | ✓ | × | | × | ✓ | 01110 |
| ✓ | × | | × | | ✓ | | × | × | × | ✓ | ✓ | × | | × | | × | ✓ | ✓ | × | | × | ✓ | 01111 |
| ✓ | × | | × | × | × | × | | ✓ | | | × | ✓ | ✓ | | × | ✓ | × | × | ✓ | ✓ | ✓ | × | 10000 |
| ✓ | × | | × | × | × | × | | ✓ | | | × | ✓ | ✓ | | × | ✓ | × | × | ✓ | ✓ | ✓ | × | 10001 |
| ✓ | × | | × | × | × | × | | ✓ | | | × | ✓ | ✓ | | × | ✓ | × | × | ✓ | ✓ | ✓ | × | 10010 |
| × | | × | ✓ | | ✓ | | × | × | × | ✓ | ✓ | × | | × | | × | ✓ | ✓ | × | | × | ✓ | 01100 |
| × | | × | ✓ | | ✓ | | × | × | × | ✓ | ✓ | × | | × | | × | ✓ | ✓ | × | | × | ✓ | 01101 |
| × | | × | ✓ | | ✓ | | × | × | × | ✓ | ✓ | × | | × | | × | ✓ | ✓ | × | | × | ✓ | 01110 |
| × | | × | ✓ | | ✓ | | × | × | × | ✓ | ✓ | × | | × | | × | ✓ | ✓ | × | | × | ✓ | 01111 |
| | × | ✓ | × | | | ✓ | × | × | × | | × | ✓ | ✓ | | × | ✓ | × | × | ✓ | ✓ | ✓ | × | 10000 |
| | × | ✓ | × | | | ✓ | × | × | × | | × | ✓ | ✓ | | × | ✓ | × | × | ✓ | ✓ | ✓ | × | 10001 |
| | × | ✓ | × | | | ✓ | × | × | × | | × | ✓ | ✓ | | × | ✓ | × | × | ✓ | ✓ | ✓ | × | 10010 |
| | × | ✓ | × | | | ✓ | × | × | × | | × | ✓ | ✓ | | × | ✓ | × | × | ✓ | ✓ | ✓ | × | 10011 |
| × | | × | ✓ | | ✓ | | × | × | × | ✓ | ✓ | × | | × | | × | ✓ | ✓ | × | | × | ✓ | 01101 |
| × | | × | ✓ | | ✓ | | × | × | × | ✓ | ✓ | × | | × | | × | ✓ | ✓ | × | | × | ✓ | 01110 |
| × | | × | ✓ | | ✓ | | × | × | × | ✓ | ✓ | × | | × | | × | ✓ | ✓ | × | | × | ✓ | 01111 |
| × | | × | ✓ | × | × | × | | ✓ | | | × | ✓ | ✓ | | × | ✓ | × | × | ✓ | ✓ | ✓ | × | 10000 |
| | × | ✓ | × | | | ✓ | × | × | × | | × | ✓ | ✓ | | × | ✓ | × | × | ✓ | ✓ | ✓ | × | 10001 |
| | × | ✓ | × | | | ✓ | × | × | × | | × | ✓ | ✓ | | × | ✓ | × | × | ✓ | ✓ | ✓ | × | 10010 |
| | × | ✓ | × | | | ✓ | × | × | × | | × | ✓ | ✓ | | × | ✓ | × | × | ✓ | ✓ | ✓ | × | 10011 |
| | × | ✓ | × | × | × | × | | | ✓ | × | | ✓ | ✓ | | × | ✓ | × | × | ✓ | ✓ | ✓ | × | 10100 |
| × | | × | ✓ | | ✓ | | × | × | × | ✓ | ✓ | × | | × | | × | ✓ | ✓ | × | | × | ✓ | 01110 |
| × | | × | ✓ | | ✓ | | × | × | × | ✓ | ✓ | × | | × | | × | ✓ | ✓ | × | | × | ✓ | 01111 |
| × | | × | ✓ | × | × | × | | ✓ | | | × | ✓ | ✓ | | × | ✓ | × | × | ✓ | ✓ | ✓ | × | 10000 |
| × | | × | ✓ | × | × | × | | ✓ | | | × | ✓ | ✓ | | × | ✓ | × | × | ✓ | ✓ | ✓ | × | 10001 |
| | × | ✓ | × | | | ✓ | × | × | × | | × | ✓ | ✓ | | × | ✓ | × | × | ✓ | ✓ | ✓ | × | 10010 |
| | × | ✓ | × | | | ✓ | × | × | × | | × | ✓ | ✓ | | × | ✓ | × | × | ✓ | ✓ | ✓ | × | 10011 |
| | × | ✓ | × | × | × | × | | | ✓ | × | | ✓ | ✓ | | × | ✓ | × | × | ✓ | ✓ | ✓ | × | 10100 |
| | × | ✓ | × | × | × | × | | | ✓ | × | | ✓ | ✓ | | × | ✓ | × | × | ✓ | ✓ | ✓ | × | 10101 |
| × | | × | ✓ | | ✓ | | × | × | × | ✓ | ✓ | × | | × | | × | ✓ | ✓ | × | | × | ✓ | 01111 |
| × | | × | ✓ | × | × | × | | ✓ | | | × | ✓ | ✓ | | × | ✓ | × | × | ✓ | ✓ | ✓ | × | 10000 |
| × | | × | ✓ | × | × | × | | ✓ | | | × | ✓ | ✓ | | × | ✓ | × | × | ✓ | ✓ | ✓ | × | 10001 |
| × | | × | ✓ | × | × | × | | ✓ | | | × | ✓ | ✓ | | × | ✓ | × | × | ✓ | ✓ | ✓ | × | 10010 |
| | × | ✓ | × | | | ✓ | × | × | × | | × | ✓ | ✓ | | × | ✓ | × | × | ✓ | ✓ | ✓ | × | 10011 |
| | × | ✓ | × | | | ✓ | × | × | × | | × | ✓ | ✓ | | × | ✓ | × | × | ✓ | ✓ | ✓ | × | 10100 |
| | × | ✓ | × | | | ✓ | × | × | × | | × | ✓ | ✓ | | × | ✓ | × | × | ✓ | ✓ | ✓ | × | 10101 |
| | × | ✓ | × | | | ✓ | × | × | × | | × | ✓ | ✓ | | × | ✓ | × | × | ✓ | ✓ | ✓ | × | 10110 |

FIG.3f

SQUARE ROOT DEVICE EMPLOYING CONVERGING APPROXIMATIONS

Filed Dec. 13, 1961 16 Sheets-Sheet 10

DISTRIBUTOR

CRYOGENIC EMBODIMENT

SQUARE ROOT DEVICE EMPLOYING CONVERGING APPROXIMATIONS

Filed Dec. 13, 1961

SQUARE ROOT DEVICE EMPLOYING CONVERGING APPROXIMATIONS

Filed Dec. 13, 1961

FIG. 7a

| ADDEND | | NEON LAMPS | | | | | | | | | | | | | | | | | | | | SUM |
|---|---|---|---|---|---|---|---|---|---|---|---|---|---|---|---|---|---|---|---|---|---|---|
| | | 102 | 104 | 106 | 107 | 108 | 116 | 118 | 128 | 130 | 132 | 134 | 140 | 142 | 144 | 146 | 148 | 150 | 152 | 154 | 156 | |
| 0000 | 000 | | ✓ | | | ✓ | | ✓ | | | ✓ | | | ✓ | | | | ✓ | | | ✓ | 00000 |
| | 001 | ✓ | | | ✓ | | | ✓ | | | ✓ | | | ✓ | | | | ✓ | | | ✓ | 00001 |
| | 010 | | ✓ | | | ✓ | ✓ | | | ✓ | | | | ✓ | | | | ✓ | | | ✓ | 00010 |
| | 011 | ✓ | | | ✓ | | ✓ | | | ✓ | | | | ✓ | | | | ✓ | | | ✓ | 00011 |
| | 100 | | ✓ | | | ✓ | | ✓ | | | ✓ | | ✓ | | | | ✓ | | | | ✓ | 00100 |
| | 101 | ✓ | | | ✓ | | | ✓ | | | ✓ | | ✓ | | | | ✓ | | | | ✓ | 00101 |
| | 110 | | ✓ | | | ✓ | ✓ | | | ✓ | | | ✓ | | | | ✓ | | | | ✓ | 00110 |
| | 111 | ✓ | | | ✓ | | ✓ | | | ✓ | | | ✓ | | | | ✓ | | | | ✓ | 00111 |
| 0001 | 000 | | ✓ | | ✓ | | | ✓ | | | ✓ | | | ✓ | | | | ✓ | | | ✓ | 00001 |
| | 001 | ✓ | | ✓ | | | | ✓ | | ✓ | | | | ✓ | | | | ✓ | | | ✓ | 00010 |
| | 010 | | ✓ | | ✓ | | ✓ | | | ✓ | | | | ✓ | | | | ✓ | | | ✓ | 00011 |
| | 011 | ✓ | | ✓ | | | ✓ | | ✓ | | | | | ✓ | | | ✓ | | | | ✓ | 00100 |
| | 100 | | ✓ | | ✓ | | | ✓ | | | ✓ | | ✓ | | | | ✓ | | | | ✓ | 00101 |
| | 101 | ✓ | | ✓ | | | | ✓ | | ✓ | | | ✓ | | | | ✓ | | | | ✓ | 00110 |
| | 110 | | ✓ | | ✓ | | ✓ | | | ✓ | | | ✓ | | | | ✓ | | | | ✓ | 00111 |
| | 111 | ✓ | | ✓ | | | ✓ | | ✓ | | | | ✓ | | | ✓ | | | | ✓ | | 01000 |
| 0010 | 000 | | ✓ | | | ✓ | | ✓ | | ✓ | | | | ✓ | | | | ✓ | | | ✓ | 00010 |
| | 001 | ✓ | | | ✓ | | | ✓ | | ✓ | | | | ✓ | | | | ✓ | | | ✓ | 00011 |
| | 010 | | ✓ | | | ✓ | ✓ | | ✓ | | | | | ✓ | | | ✓ | | | | ✓ | 00100 |
| | 011 | ✓ | | | ✓ | | ✓ | | ✓ | | | | | ✓ | | | ✓ | | | | ✓ | 00101 |
| | 100 | | ✓ | | | ✓ | | ✓ | | ✓ | | | ✓ | | | | ✓ | | | | ✓ | 00110 |
| | 101 | ✓ | | | ✓ | | | ✓ | | ✓ | | | ✓ | | | | ✓ | | | | ✓ | 00111 |
| | 110 | | ✓ | | | ✓ | ✓ | | ✓ | | | | ✓ | | | ✓ | | | | ✓ | | 01000 |
| | 111 | ✓ | | | ✓ | | ✓ | | ✓ | | | | ✓ | | | ✓ | | | | ✓ | | 01001 |
| 0011 | 000 | | ✓ | | ✓ | | | ✓ | | ✓ | | | | ✓ | | | | ✓ | | | ✓ | 00011 |
| | 001 | ✓ | | ✓ | | | | ✓ | ✓ | | | | | ✓ | | | ✓ | | | | ✓ | 00100 |
| | 010 | | ✓ | | ✓ | | ✓ | | ✓ | | | | | ✓ | | | ✓ | | | | ✓ | 00101 |
| | 011 | ✓ | | ✓ | | | ✓ | | | | | ✓ | | ✓ | | | ✓ | | | | ✓ | 00110 |
| | 100 | | ✓ | | ✓ | | | ✓ | | ✓ | | | ✓ | | | | ✓ | | | | ✓ | 00111 |
| | 101 | ✓ | | ✓ | | | | ✓ | ✓ | | | | ✓ | | | ✓ | | | | ✓ | | 01000 |
| | 110 | | ✓ | | ✓ | | ✓ | | ✓ | | | | ✓ | | | ✓ | | | | ✓ | | 01001 |
| | 111 | ✓ | | ✓ | | | ✓ | | | | | ✓ | ✓ | | | ✓ | | | | ✓ | | 01010 |
| 0100 | 000 | | ✓ | | | ✓ | | ✓ | | | ✓ | | | ✓ | | | ✓ | | | | ✓ | 00100 |
| | 001 | ✓ | | | ✓ | | | ✓ | | | ✓ | | | ✓ | | | ✓ | | | | ✓ | 00101 |
| | [illegible] | | ✓ | | | ✓ | ✓ | | | ✓ | | | | ✓ | | | ✓ | | | | ✓ | 00110 |
| | 011 | ✓ | | | ✓ | | ✓ | | | ✓ | | | | ✓ | | | ✓ | | | | ✓ | 00111 |
| | 100 | | ✓ | | | ✓ | | ✓ | | | ✓ | | ✓ | | | ✓ | | | | ✓ | | 01000 |
| | 101 | ✓ | | | ✓ | | | ✓ | | | ✓ | | ✓ | | | ✓ | | | | ✓ | | 01001 |
| | 110 | | ✓ | | | ✓ | ✓ | | | ✓ | | | ✓ | | | ✓ | | | | ✓ | | 01010 |
| | 111 | ✓ | | | ✓ | | ✓ | | | ✓ | | | ✓ | | | ✓ | | | | ✓ | | 01011 |

| |
|---|
| FIG. 7a |
| FIG. 7b |
| FIG. 7c |

FIG. 7

FIG. 7b

| | | | | | | | | | | | | | | | | | | | | | | |
|---|---|---|---|---|---|---|---|---|---|---|---|---|---|---|---|---|---|---|---|---|---|---|
| 0101 | 000 | | ✓ | | ✓ | | | ✓ | | | ✓ | | | ✓ | | | ✓ | | | | ✓ | 00101 |
| | 001 | ✓ | | ✓ | | | | ✓ | | ✓ | | | | ✓ | | | ✓ | | | | ✓ | 00110 |
| | 010 | | ✓ | | ✓ | | ✓ | | | ✓ | | | | ✓ | | | ✓ | | | | ✓ | 00111 |
| | 011 | ✓ | | ✓ | | | ✓ | | ✓ | | | | | ✓ | | ✓ | | | | ✓ | | 01000 |
| | 100 | | ✓ | | ✓ | | | ✓ | | | ✓ | | ✓ | | | ✓ | | | | ✓ | | 01001 |
| | 101 | ✓ | | ✓ | | | | ✓ | | ✓ | | | ✓ | | | ✓ | | | | ✓ | | 01010 |
| | 110 | | ✓ | | ✓ | | ✓ | | | ✓ | | | ✓ | | | ✓ | | | | ✓ | | 01011 |
| | 111 | ✓ | | ✓ | | | ✓ | | ✓ | | | | ✓ | | ✓ | | | | | ✓ | | 01100 |
| 0110 | 000 | | ✓ | | | ✓ | | ✓ | | ✓ | | | | ✓ | | | ✓ | | | | ✓ | 00110 |
| | 001 | ✓ | | | ✓ | | | ✓ | | ✓ | | | | ✓ | | | ✓ | | | | ✓ | 00111 |
| | 010 | | ✓ | | | ✓ | ✓ | | ✓ | | | | | ✓ | | ✓ | | | | ✓ | | 01000 |
| | 011 | ✓ | | | ✓ | | ✓ | | ✓ | | | | | ✓ | | ✓ | | | | ✓ | | 01001 |
| | 100 | | ✓ | | | ✓ | | ✓ | | ✓ | | | ✓ | | | ✓ | | | | ✓ | | 01010 |
| | 101 | ✓ | | | ✓ | | | ✓ | | ✓ | | | ✓ | | | ✓ | | | | ✓ | | 01011 |
| | 110 | | ✓ | | | ✓ | ✓ | | ✓ | | | | ✓ | | ✓ | | | | | ✓ | | 01100 |
| | 111 | ✓ | | | ✓ | | ✓ | | ✓ | | | | ✓ | | ✓ | | | | | ✓ | | 01101 |
| 0111 | 000 | | ✓ | | ✓ | | | ✓ | | ✓ | | | | ✓ | | | ✓ | | | | ✓ | 00111 |
| | 001 | ✓ | | ✓ | | | | ✓ | | ✓ | | | | ✓ | | ✓ | | | | ✓ | | 01000 |
| | 010 | | ✓ | | ✓ | | ✓ | | ✓ | | | | | ✓ | | ✓ | | | | ✓ | | 01001 |
| | 011 | ✓ | | ✓ | | | ✓ | | ✓ | | | | | ✓ | | ✓ | | | | ✓ | | 01010 |
| | 100 | | ✓ | | ✓ | | | ✓ | | ✓ | | | ✓ | | | ✓ | | | | ✓ | | 01011 |
| | 101 | ✓ | | ✓ | | | | ✓ | ✓ | | | | ✓ | | ✓ | | | | | ✓ | | 01100 |
| | 110 | | ✓ | | ✓ | | ✓ | | ✓ | | | | ✓ | | ✓ | | | | | ✓ | | 01101 |
| | 111 | ✓ | | ✓ | | | ✓ | | | | | ✓ | ✓ | | ✓ | | | | | ✓ | | 01110 |
| 1000 | 000 | | ✓ | | | ✓ | | ✓ | | | ✓ | | | ✓ | | | | ✓ | | ✓ | | 01000 |
| | 001 | ✓ | | | ✓ | | | ✓ | | | ✓ | | | ✓ | | | | ✓ | | ✓ | | 01001 |
| | 010 | | ✓ | | | ✓ | ✓ | | | ✓ | | | | ✓ | | | | ✓ | | ✓ | | 01010 |
| | 011 | ✓ | | | ✓ | | ✓ | | | ✓ | | | | ✓ | | | | ✓ | | ✓ | | 01011 |
| | 100 | | ✓ | | | ✓ | | ✓ | | | ✓ | | ✓ | | | | ✓ | | | ✓ | | 01100 |
| | 101 | ✓ | | | ✓ | | | ✓ | | | ✓ | | ✓ | | | | ✓ | | | ✓ | | 01101 |
| | 110 | | ✓ | | | ✓ | ✓ | | | ✓ | | | ✓ | | | | ✓ | | | ✓ | | 01110 |
| | 111 | ✓ | | | ✓ | | ✓ | | | ✓ | | | ✓ | | | | ✓ | | | ✓ | | 01111 |
| 1001 | 000 | | ✓ | | ✓ | | | ✓ | | | ✓ | | | ✓ | | | | ✓ | | ✓ | | 01001 |
| | 001 | ✓ | | ✓ | | | | ✓ | | ✓ | | | | ✓ | | | | ✓ | | ✓ | | 01010 |
| | 010 | | ✓ | | ✓ | | ✓ | | | ✓ | | | | ✓ | | | | ✓ | | ✓ | | 01011 |
| | 011 | ✓ | | ✓ | | | ✓ | | ✓ | | | | | ✓ | | | ✓ | | | ✓ | | 01100 |
| | 100 | | ✓ | | ✓ | | | ✓ | | | ✓ | | ✓ | | | | ✓ | | | ✓ | | 01101 |
| | 101 | ✓ | | ✓ | | | | ✓ | | ✓ | | | ✓ | | | | ✓ | | | ✓ | | 01110 |
| | 110 | | ✓ | | ✓ | | ✓ | | | ✓ | | | ✓ | | | | ✓ | | | ✓ | | 01111 |
| | 111 | ✓ | | ✓ | | | ✓ | | ✓ | | | | ✓ | | | ✓ | | | ✓ | | | 10000 |
| 1010 | 000 | | ✓ | | | ✓ | | ✓ | | ✓ | | | | ✓ | | | | ✓ | | ✓ | | 01010 |
| | 001 | ✓ | | | ✓ | | | ✓ | | ✓ | | | | ✓ | | | | ✓ | | ✓ | | 01011 |
| | 010 | | ✓ | | | ✓ | ✓ | | ✓ | | | | | ✓ | | | ✓ | | | ✓ | | 01100 |
| | 011 | ✓ | | | ✓ | | ✓ | | ✓ | | | | | ✓ | | | ✓ | | | ✓ | | 01101 |

FIG. 7c

| | | | | | | | | | | | | | | | | | | | | | | |
|---|---|---|---|---|---|---|---|---|---|---|---|---|---|---|---|---|---|---|---|---|---|---|
| 1010 | 100 | | ✓ | | | ✓ | | ✓ | | ✓ | | | ✓ | | | | ✓ | | | ✓ | | 01110 |
| | 101 | ✓ | | | ✓ | | | ✓ | | ✓ | | | ✓ | | | | ✓ | | | ✓ | | 01111 |
| | 110 | | ✓ | | | ✓ | ✓ | | ✓ | | | | ✓ | | | ✓ | | | ✓ | | | 10000 |
| | 111 | ✓ | | | ✓ | | ✓ | | ✓ | | | | ✓ | | | ✓ | | | ✓ | | | 10001 |
| 1011 | 000 | | ✓ | | ✓ | | | ✓ | | ✓ | | | | ✓ | | | | ✓ | | ✓ | | 01011 |
| | 001 | ✓ | | ✓ | | | | ✓ | | ✓ | | | | ✓ | | | | ✓ | | ✓ | | 01100 |
| | 010 | | ✓ | | ✓ | | ✓ | | ✓ | | | | | ✓ | | | ✓ | | | ✓ | | 01101 |
| | 011 | ✓ | | ✓ | | | ✓ | | | | | ✓ | | ✓ | | | ✓ | | | ✓ | | 01110 |
| | 100 | | ✓ | | ✓ | | | ✓ | | ✓ | | | ✓ | | | | ✓ | | | ✓ | | 01111 |
| | 101 | ✓ | | ✓ | | | | ✓ | ✓ | | | | ✓ | | | ✓ | | | ✓ | | | 10000 |
| | 110 | | ✓ | | ✓ | | ✓ | | ✓ | | | | ✓ | | | ✓ | | | ✓ | | | 10001 |
| | 111 | ✓ | | ✓ | | | ✓ | | | | | ✓ | ✓ | | | ✓ | | | ✓ | | | 10010 |
| 1100 | 000 | | ✓ | | | ✓ | | ✓ | | | ✓ | | | ✓ | | | ✓ | | | ✓ | | 01100 |
| | 001 | ✓ | | | ✓ | | | ✓ | | | ✓ | | | ✓ | | | ✓ | | | ✓ | | 01101 |
| | 010 | | ✓ | | | ✓ | ✓ | | | ✓ | | | | ✓ | | | ✓ | | | ✓ | | 01110 |
| | 011 | ✓ | | | ✓ | | ✓ | | | ✓ | | | | ✓ | | | ✓ | | | ✓ | | 01111 |
| | 100 | | ✓ | | | ✓ | | ✓ | | | ✓ | | ✓ | | | ✓ | | | ✓ | | | 10000 |
| | 101 | ✓ | | | ✓ | | | ✓ | | | ✓ | | ✓ | | | ✓ | | | ✓ | | | 10001 |
| | 110 | | ✓ | | | ✓ | ✓ | | | ✓ | | | ✓ | | | ✓ | | | ✓ | | | 10010 |
| | 111 | ✓ | | | ✓ | | ✓ | | | ✓ | | | ✓ | | | ✓ | | | ✓ | | | 10011 |
| 1101 | 000 | | ✓ | | ✓ | | | ✓ | | | ✓ | | | ✓ | | | ✓ | | | ✓ | | 01101 |
| | 001 | ✓ | | ✓ | | | | ✓ | | ✓ | | | | ✓ | | | ✓ | | | ✓ | | 01110 |
| | 010 | | ✓ | | ✓ | | ✓ | | | ✓ | | | | ✓ | | | ✓ | | | ✓ | | 01111 |
| | 011 | ✓ | | ✓ | | | ✓ | | ✓ | | | | | ✓ | | ✓ | | | ✓ | | | 10000 |
| | 100 | | ✓ | | ✓ | | | ✓ | | | ✓ | | ✓ | | | ✓ | | | ✓ | | | 10001 |
| | 101 | ✓ | | ✓ | | | | ✓ | | ✓ | | | ✓ | | | ✓ | | | ✓ | | | 10010 |
| | 110 | | ✓ | | ✓ | | ✓ | | | ✓ | | | ✓ | | | ✓ | | | ✓ | | | 10011 |
| | 111 | ✓ | | ✓ | | | ✓ | | ✓ | | | | ✓ | | ✓ | | | | ✓ | | | 10100 |
| 1110 | 000 | | ✓ | | | ✓ | | ✓ | | ✓ | | | | ✓ | | | ✓ | | | ✓ | | 01110 |
| | 001 | ✓ | | | ✓ | | | ✓ | | ✓ | | | | ✓ | | | ✓ | | | ✓ | | 01111 |
| | 010 | | ✓ | | | ✓ | ✓ | | ✓ | | | | | ✓ | | ✓ | | | ✓ | | | 10000 |
| | 011 | ✓ | | | ✓ | | ✓ | | ✓ | | | | | ✓ | | ✓ | | | ✓ | | | 10001 |
| | 100 | | ✓ | | | ✓ | | ✓ | | ✓ | | | ✓ | | | ✓ | | | ✓ | | | 10010 |
| | 101 | ✓ | | | ✓ | | | ✓ | | ✓ | | | ✓ | | | ✓ | | | ✓ | | | 10011 |
| | 110 | | ✓ | | | ✓ | ✓ | | ✓ | | | | ✓ | | ✓ | | | | ✓ | | | 10100 |
| | 111 | ✓ | | | ✓ | | ✓ | | ✓ | | | | ✓ | | ✓ | | | | ✓ | | | 10101 |
| 1111 | 000 | | ✓ | | ✓ | | | ✓ | | ✓ | | | | ✓ | | | ✓ | | | ✓ | | 01111 |
| | 001 | ✓ | | ✓ | | | | ✓ | | ✓ | | | | ✓ | | ✓ | | | ✓ | | | 10000 |
| | 010 | | ✓ | | ✓ | | ✓ | | ✓ | | | | | ✓ | | ✓ | | | ✓ | | | 10001 |
| | 011 | ✓ | | ✓ | | | ✓ | | | | | ✓ | | ✓ | | ✓ | | | ✓ | | | 10010 |
| | 100 | | ✓ | | ✓ | | | ✓ | | ✓ | | | ✓ | | | ✓ | | | ✓ | | | 10011 |
| | 101 | ✓ | | ✓ | | | | ✓ | ✓ | | | | ✓ | | ✓ | | | | ✓ | | | 10100 |
| | 110 | | ✓ | | ✓ | | ✓ | | ✓ | | | | ✓ | | ✓ | | | | ✓ | | | 10101 |
| | 111 | ✓ | | ✓ | | | ✓ | | | | | ✓ | ✓ | | ✓ | | | | ✓ | | | 10110 |

SELECTOR
NEON – PC
EMBODIMENT

United States Patent Office 3,234,369
Patented Feb. 8, 1966

3,234,369

SQUARE ROOT DEVICE EMPLOYING CONVERGING APPROXIMATIONS

Robert I. Roth, Briarcliff Manor, and Harold Fleisher, Poughkeepsie, N.Y., assignors to International Business Machines Corporation, New York, N.Y., a corporation of New York Filed Dec. 13, 1961, Ser. No. 159,034
8 Claims. (Cl. 235—164)

This invention relates to computing techniques and, in particular, to computing techniques for solving those problems which lend themselves to resolution by iterative processes of converging approximations. Included in this class of problems are root determinations, division, problems which may be resolved by techniques employing continued fractions, and many others.

Many computers that are adaptable for use in solving problems of the type defined above utilize shift registers and other circuits requiring synchronization. These computers inherently require control circuits and are beset with complex timing problems. The present invention involves computing techniques that avoid these and other difficulties that are inherent in many prior art devices. In the present invention, completely unsynchronized apparatus is used to provide a solution to problems of the class outlined above. In addition, these techniques provide a continuous solution which is promptly corrected when the computer input data is changed.

These computing techniques are shown in two embodiments of square root computers, one utilizing cryogenic elements and the other neon lamps and photoconductor elements. These embodiments are especially useful in illustrating the invention because the derivation of square roots is known to pose relatively complex problems.

An object of the present invention is to demonstrate computing techniques that do not require synchronization.

Another object is to teach computing techniques for solving problems which lend themselves to resolution by iterative processes of converging approximations.

A more particular object of the present invention is to show an unsynchronized square root computer.

A futher object is to show an unsynchronized, digital square root computer using cryogenic elements.

Another object is to show an unsynchronized, digital square root computer using neon-photoconductor elements.

The foregoing and other objects, features and advantages of the invention will be apparent from the following more particular description of preferred embodiments of the invention, as illustrated in the accompanying drawings.

The unsynchronized computing techniques of the present invention are embodied in square root computers. Among the available techniques for computing square roots is the iterative method that is often used in paper and pencil calculations and which is illustrated in the following example for extracting the square root of the decimal radicand 81,796:

| | | | | | |
|---|---|---|---|---|---|
| (Step 1) | | 2 | 8 | 6.=square root | |
| | | √08 | 17 | 96.=radicand | |
| (Step 2) | $2_2$= | 4 | | | |
| (Step 3) | | 4 | 17 | | |
| (Step 4) | 48×8= | 3 | 84 | | |
| (Step 5) | | | 33 | 96 | |
| (Step 6) | 566×6= | | 33 | 96 | |

*Step 1.*—Partition the radicand into pairs of digits, counting from the decimal point.

*Step 2.*—Select, as the highest order digit of the square root, the largest number (2) whose square does not exceed the value of the highest order radicand pair (08).

*Step 3.*—Subtract the square (4) of the number (2) selected in step two from the highest order radicand pair (08) and place the next pair of radicand digits (17) to the right of this difference (to obtain 417).

*Step 4.*—Select, as the next digit of the square root, the largest number (8) which does not generate a product (384) that exceeds the number (417) determined in step three when multiplied by a number (48) obtained by doubling the digit (2) obtained in step two followed by the number (8) selected in this step.

*Step. 5.*—Subtract the product (384) referred to in step four from the number (417) obtained in step 3 and place the next pair of radicand digits (96) to the right of this difference (to obtain 3396).

*Step 6.*—Repeat step four, operating on the number (3396) obtained in step five.

This same procedure may be used for determining square roots of numbers in other radices and the following example illustrates the extraction of the square root of the binary radicand 10101001:

| | | | | |
|---|---|---|---|---|
| | 1 | 1 | 0 | 1 =square root |
| | √10 | 10 | 10 | 01.=radicand |
| $1^2$= | 1 | | | |
| | 1 | 10 | | |
| 101×1= | 1 | 01 | | |
| | | 1 | 10 | |
| 1100×0= | | | 0 | |
| | | 1 | 10 | 01 |
| 11001×1= | | 1 | 10 | 01 |

The procedure is considerably simpler in the binary system than in the decimal system because a number is doubled merely by placing a zero to its right. For example, the binary number "11" is doubled by adding a zero to obtain "110." Furthermore, since numbers in the binary system are limited to either "0" or "1," the relatively complicated selections made in steps four and six in the decimal example above degenerate into a determination of whether a number comprised of the previously-determined radicand digits, followed by the digits 01, (corresponding to doubling the previously-determined radicand digits and tentatively selecting a "1" as the next radicand digit), exceeds the result of the previous subtraction (steps three and five). In the present invention, this procedure is modified to replace the subtraction operations with addition and an example of this modified procedure for extracting the square root of the binary radicand 10101001 (used in the above example) follows:

| | | | | |
|---|---|---|---|---|
| | 1 | 1 | 0 | 1.=square root |
| (Step 1) | √01 | 01 | 01 | 10.=complemented radicand |
| (Step 2) | 1 | | | |
| (Step 3) | 10 | 01 | | |
| (Step 4) | 1 | 01 | | |
| (Step 5) | 11 | 10 | 01 | |
| (Step 6) | | 00 | 00 | |
| (Step 7) | 11 | 10 | 01 | 10 |
| (Step 8) | | 1 | 10 | 01 |
| | 11 | 11 | 11 | 11 |

*Step 1.*—Generate the complement of the radicand by replacing each "1" with a "0" and each "0" with a "1" and then partition the complemented radicand into pairs of digits, starting from the binary point.

*Step 2.*—Add, to the first pair of complemented radicand digits (01), the square of (1) of the largest number (1) which does not generate a "1" carry. This number (1) represents the highest order digit of the uncomplemented square root.

*Step 3.*—Place the next pair of complemented radicand digits (01) to the right of the sum (10) generated in step two (to obtain 1001).

*Step 4.*—Select, as the next digit (1) of the square root, the largest number (1) which, when multiplied by twice the previously generated square root digit (1) followed by the selected number, does not result in a "1" carry when added to the number (1001) obtained in step three. Add this product to the number obtained in step three. This may be done mechanically by tentatively adding "01" to the right of the previously generated square root digits and checking for a carry when adding to the number obtained in step three. As stated above, adding "01" to the right of a binary number corresponds to doubling the number and tentatively selecting a "1" as the next radicand digit. If a carry is generated, this indicates that a "0" could have been selected and, in this case, the result of tentative addition is not used and the number obtained in step three is carried down and the next two digits of the complemented radicand are placed to the right of this number.

*Steps 5–8.*—Repeat steps three and four alternately to generate the remainder of the digits of the square root. When a sum made up of all "1" bits with a "0" carry is obtained, the exact square root has been extracted.

The procedure outlined in the last example is readily adaptable to unsynchronized computer circuitry and forms the basis of operation of the computers embodying the invention as shown in the accompanying drawings.

In the drawings:

FIGURE 1 is an organizational diagram illustrating the interconnection of FIGURES 1*a* and 1*b*.

FIGURES 1*a* and 1*b* comprise a block diagram of a square root cumputer.

Figure 2:
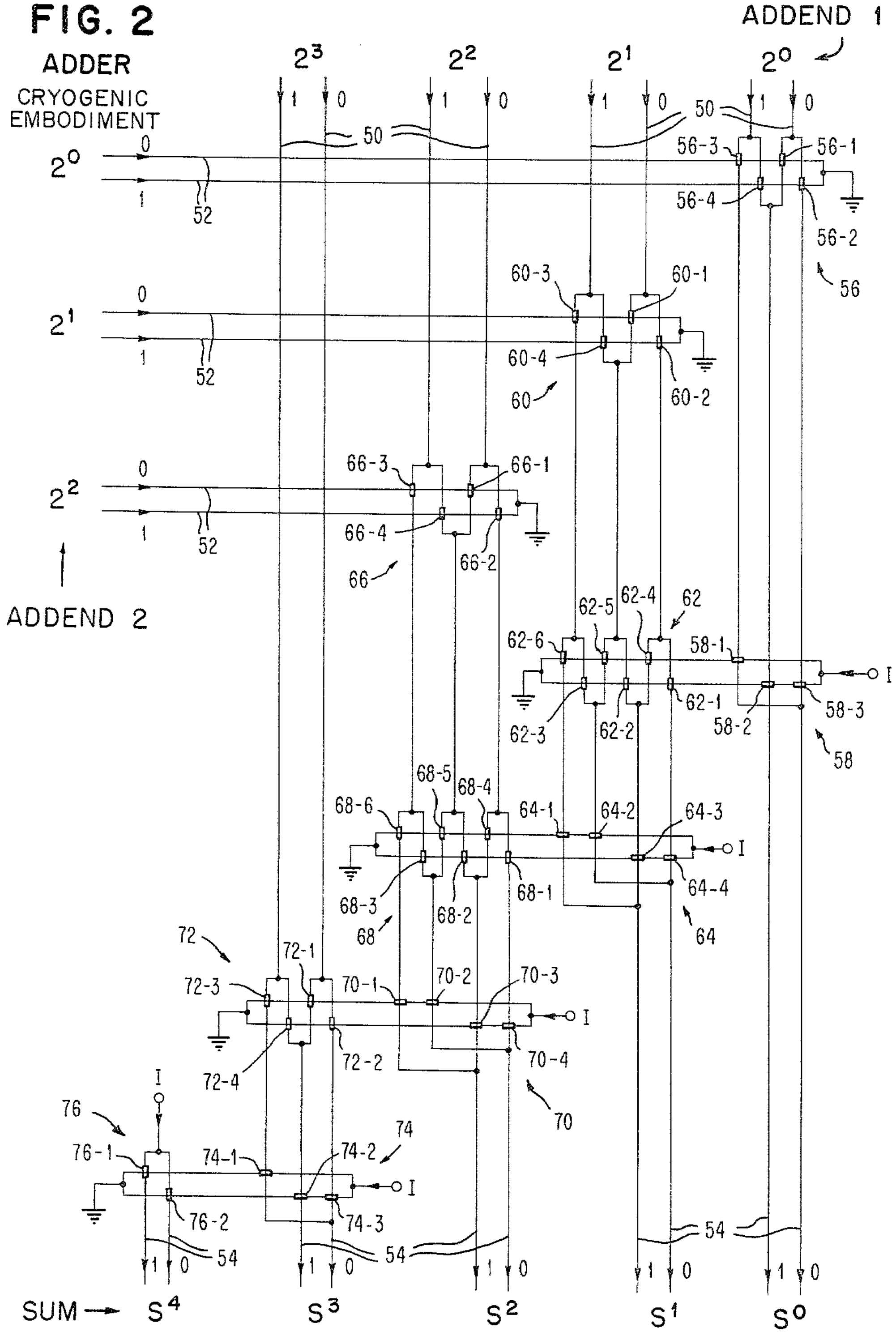
FIGURE 2 is a detailed diagram of an adder circuit suitable for use in a cryogenic embodiment of the invention shown in FIGURE 1.
Figure 3C:
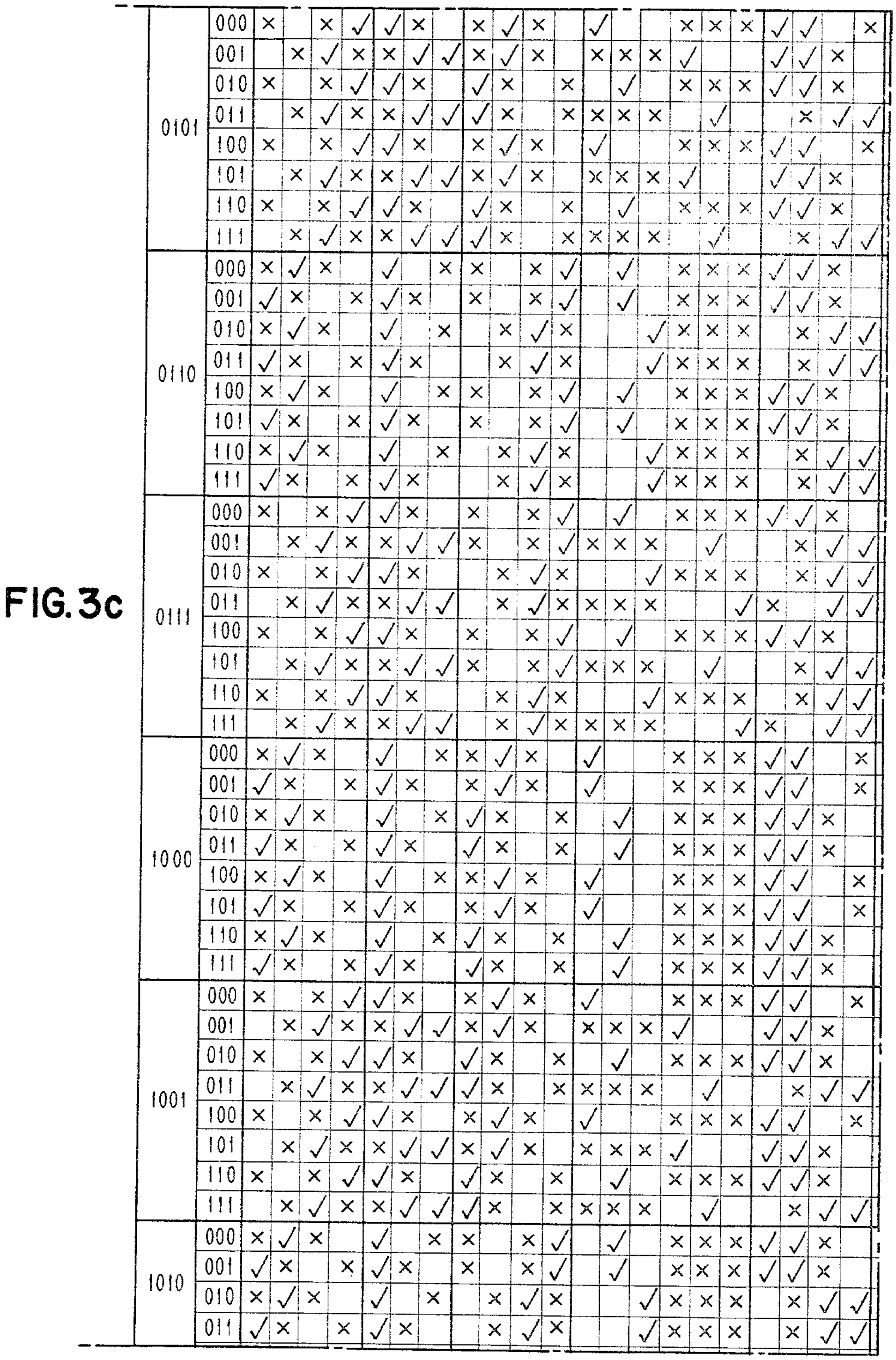
FIGURE 3 is an organizational diagram illustrating the interconnection of FIGURES 3*a*–3*f*.

FIGURES 3*a*–3*f* comprise a chart indicating the status of the cryogenic elements in the adder shown in FIGURE 2 for all possible addend inputs.

Figures 1, 1A:
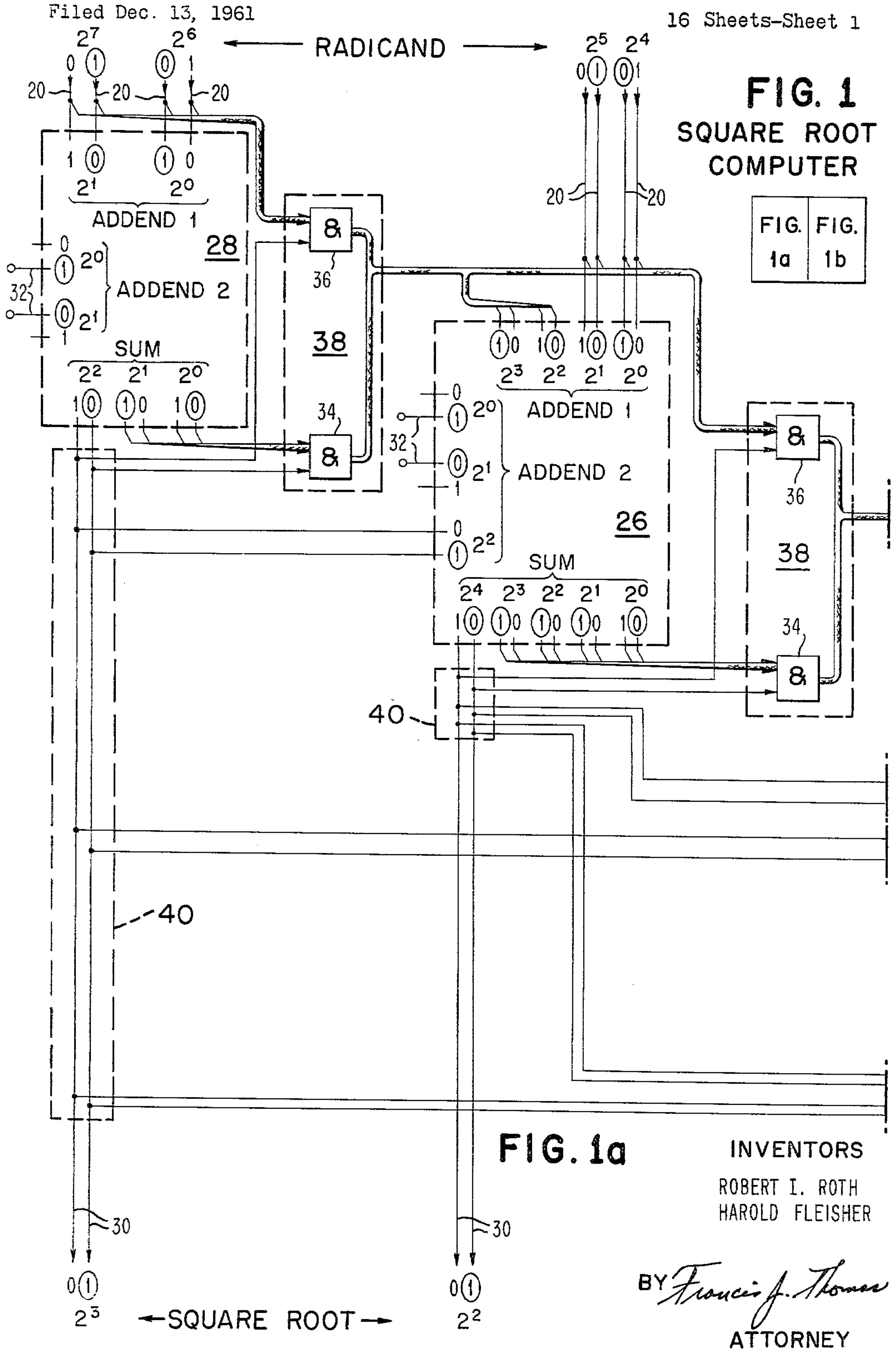
Figure 1B:
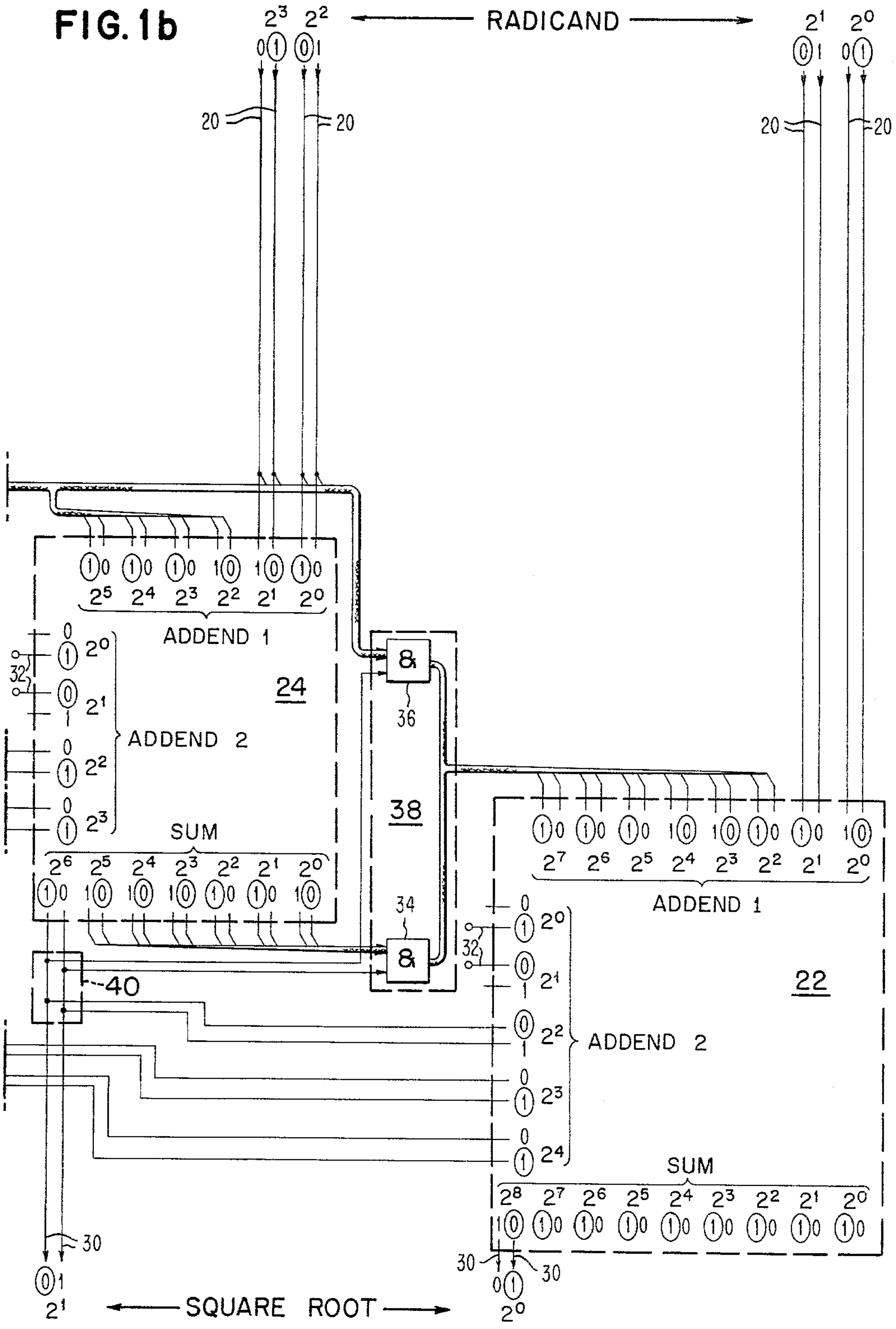
Figure 4:
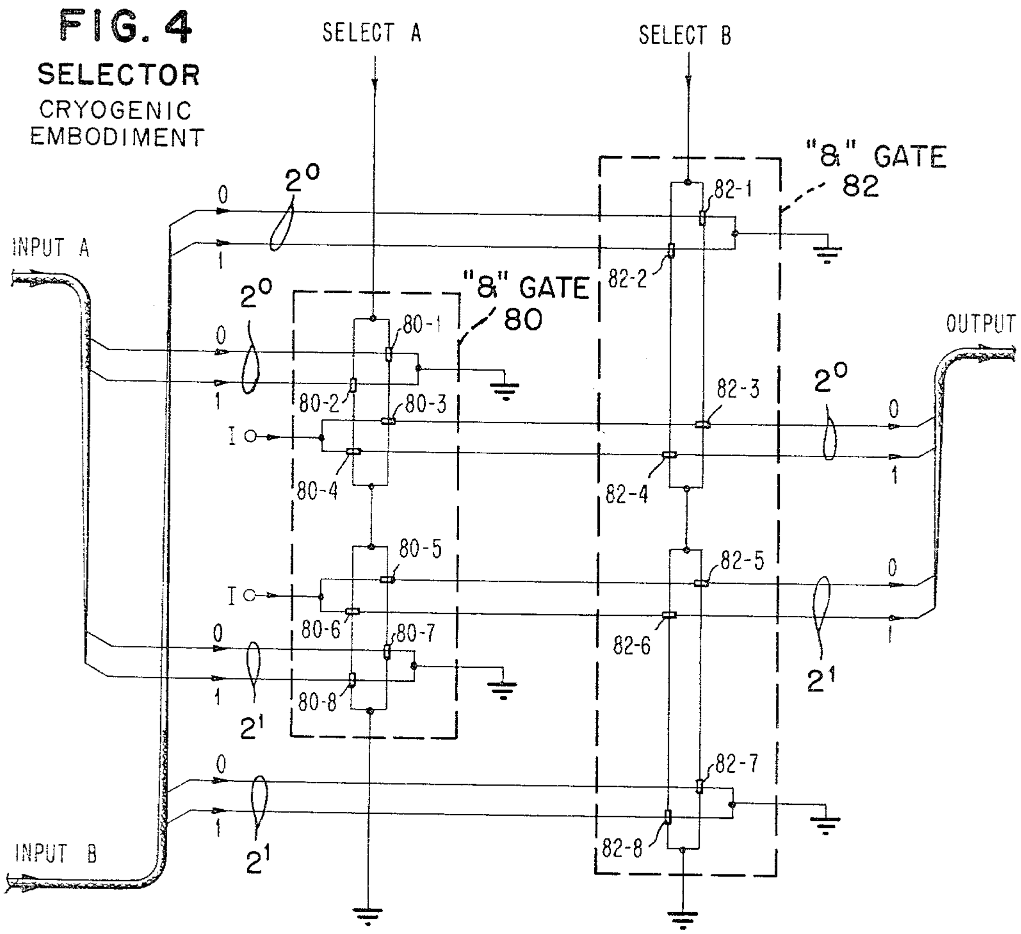

FIGURE 4 is a detailed diagram of a selector circuit suitable for use in a cryogenic embodiment of the invention in FIGURE 1.

Figure 5:
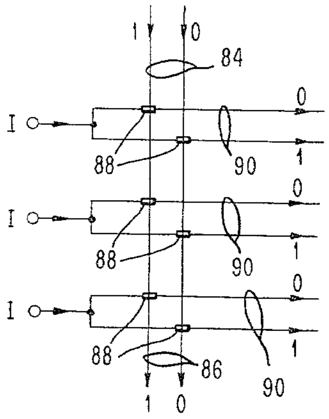

FIGURE 5 is a detailed diagram of a distributor circuit suitable for use in a cryogenic embodment of the invention shown in FIGURE 1.

Figures 6, 6A:
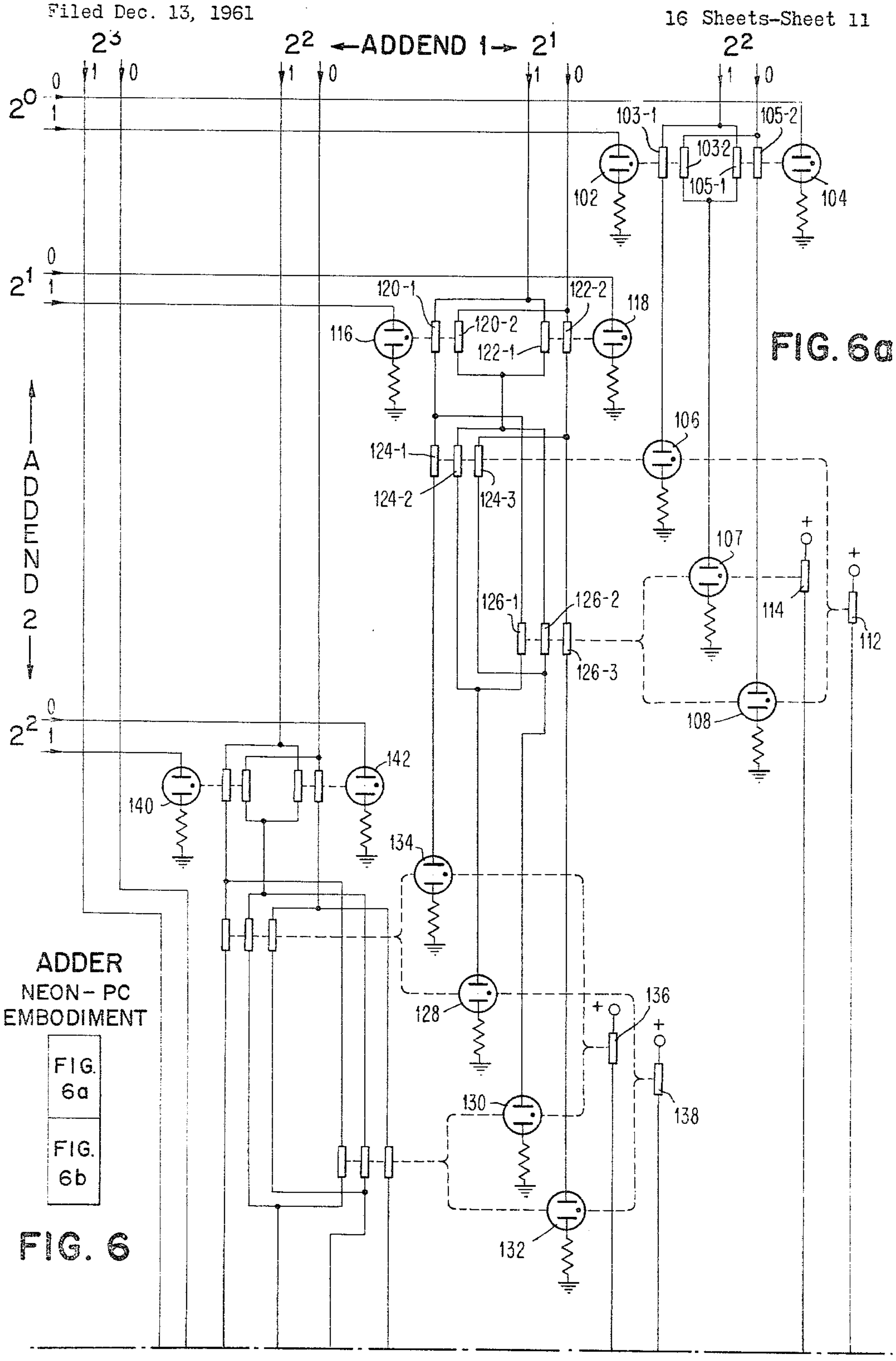
Figure 6B:
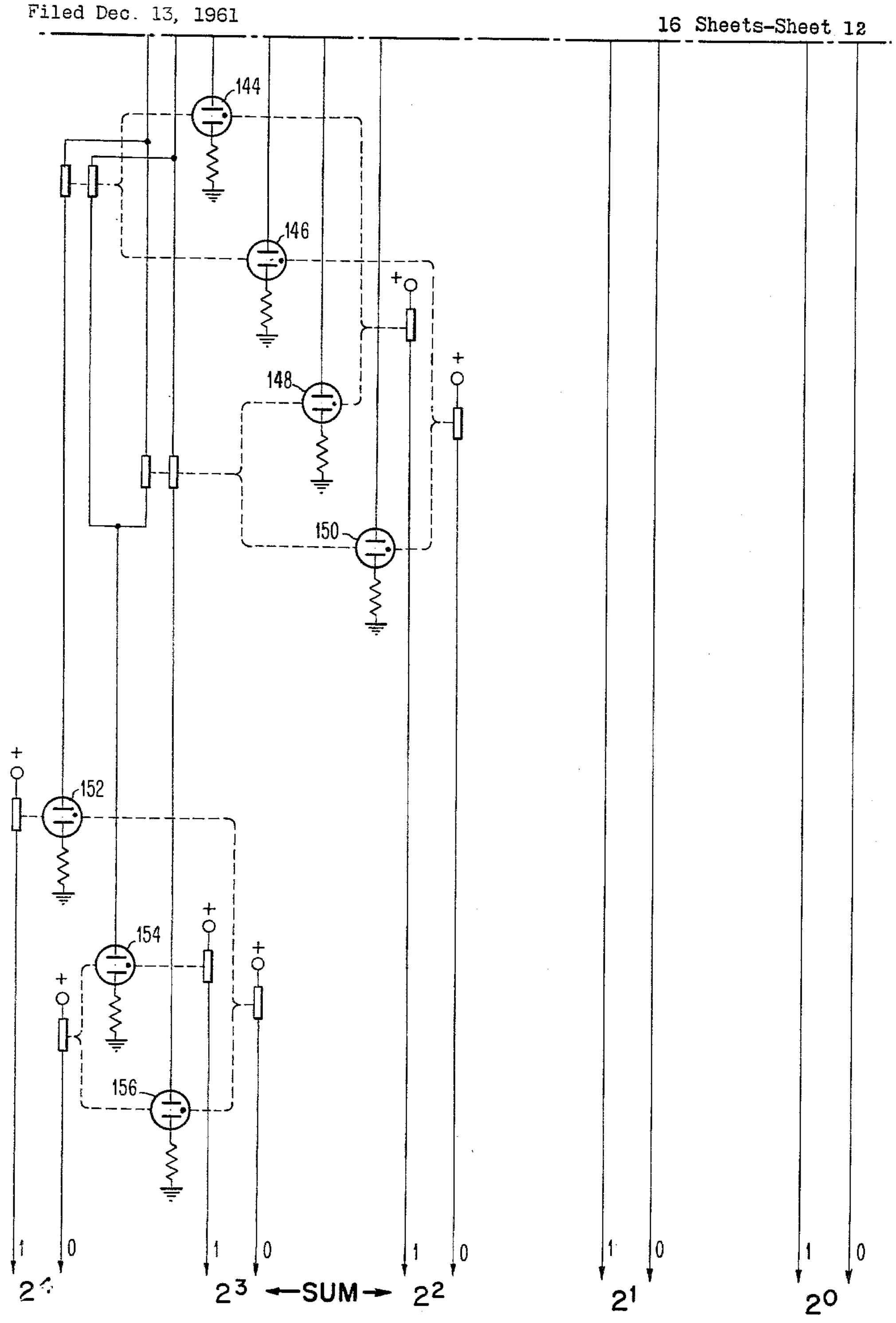

FIGURE 6 is an organizational diagram illustrating the interconnection of FIGURES 6*a* and 6*b*.

FIGURES 6*a* and 6*b* comprise a detailed diagram of an adder circuit suitable for use in a neon-photoconductor embodiment of the invention shown in FIGURE 1.

FIGURE 7 is an organizational diagram illustrating the interconnection of FIGURES 7*a*–7*c*.

FIGURES 7*a*–7*c* comprise a chart indicating the status of the neon lamps in the adder shown in FIGURE 6 for all possible addends.

Figure 8:
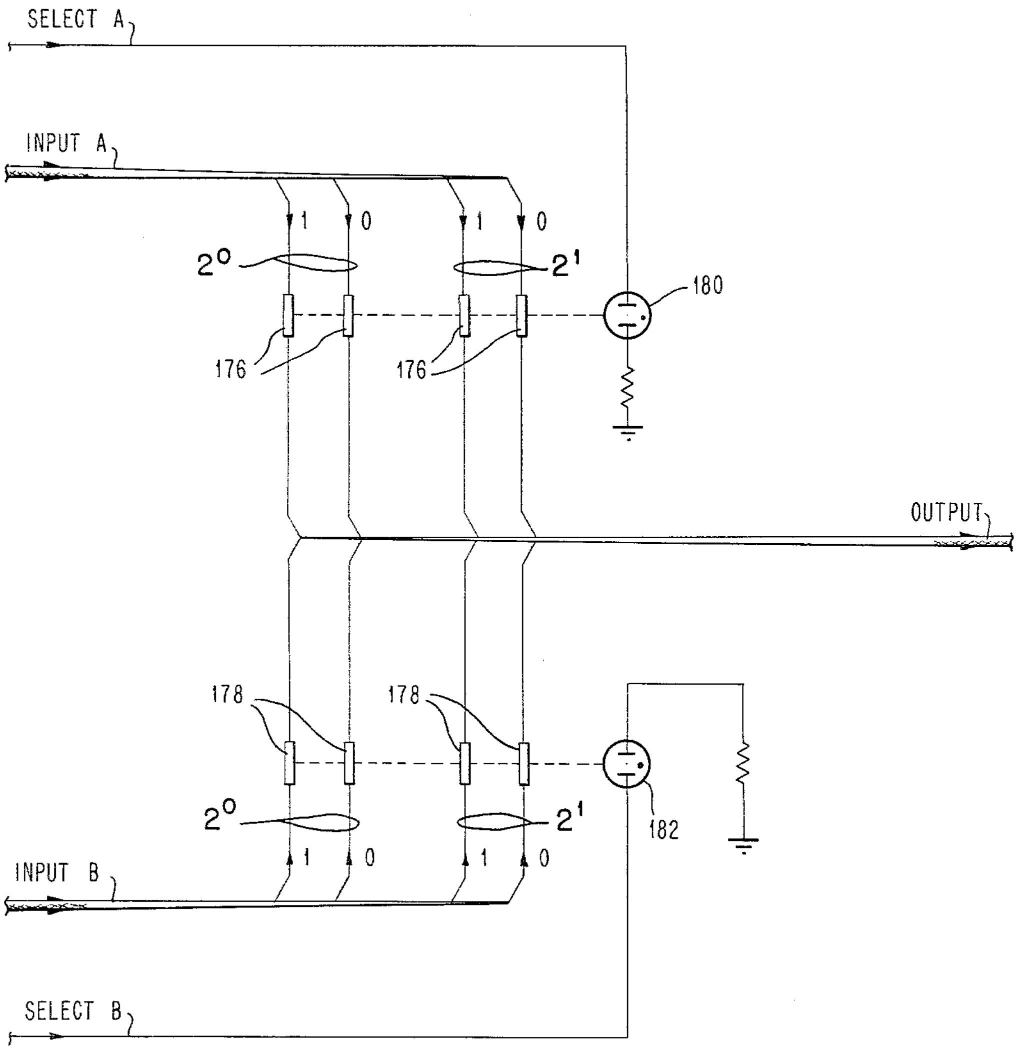

FIGURE 8 is a detailed diagram of a selector circuit suitable for use in a neon-photoconductor embodiment of the invention shown in FIGURE 1.

Many of the numbers in the block diagram in FIGURE 1 are encircled. These circles may be ignored during the following general description as they relate to an illustrative example which follows the general description.

An eight-bit (digit) radicand is applied to the input of the square root computer shown in FIGURE 1 on leads 20. Each pair of leads corresponds to one bit of data. The pairs of leads are also labelled to indicate the radicand bit orders ($2^0$ through $2^7$).

The lowest two orders ($2^0$ and $2^1$) of the radicand are applied as part of a first input (addend 1) to an adder 22. The next higher two orders of the radicand input are similarly applied to another adder 24, and the successively higher orders of the radicand are applied to adders 26 and 28. The radicand is automatically complemented as applied to the adders by applying each "1" lead as the "0" data and each "0" lead as the "1" data of the corresponding adder position or order. Each adder contributes one bit of data to the output square root on a pair of leads 30. These pairs of leads are also labelled to correspond to the order of the output ($2^0$ through $2^3$).

The two lowest-order bits of the second input (addend 2) to each adder are "01" and this is accomplished by connecting the appropriate adder inputs to a fixed signal applied through leads 32. This operation corresponds to doubling the higher-order bits and tentatively selecting a "1" for each bit of the square root. The remaining (higher-order) bits to the second input (addend 2) of each adder (except the highest order adder 28) represent the bits of the square root generated by the higher-order adders. Each adder generates a tentative sum including a carry bit as the highest order bit of the sum. As described above with respect to the last sample calculation, each bit of the square root is selected as the largest number that provides no carry. Thus, a "1" carry indicates that the tentatively selected bit ("1") is too large and that a "0" should have been selected. Therefore, each bit of the square root is merely the complement of the carry signal generated in the appropriate adder. This complementing operation is accomplished by properly labelling the square root output leads. Since a "0" carry indicates that the corresponding bit of the square root is a "1" and that the result of the tentative addition should be used, this "0" signal is applied to condition an "and" gate 34 which passes the sum to the subsequent (lower-order) adder where it forms the higher-order bits of one input. The two lower-order bits of this adder input are the subsequent (lower-order) pair of complemented radicand bits, as described above. Similarly, a "1" carry indicates that the corresponding bit of the square root is a "0" and that the result of the tentative addition should not be used. In this case, the "1" carry signal is applied to condition an "and" gate 36 which passes the first adder input (addend 1) rather than the sum to the subsequent (lower order) adder.

In FIGURE 1, each pair of "and" gates 34, 36 is considered to form a selector 38 and the distribution network for each carry signal is considered to form a distributor 40. This combination of "and" gates and networks into selectors and distributors has been done merely to facilitate the detailed discussion of these circuits.

The following description of the step-by-step operation of the system shown in FIGURE 1 for the radicand 10101001 (also used in the introductory examples) is included to provide a better understaanding of the invention.

The sample input radicand 10101001 on leads 20 is shown in FIGURE 1 by the encircled "0" and "1" lead designations. This number is complemented by the connections to the adder as indicated by the encircled addend data. Thus, the highest order radicand bits "10" are complemented into "01" as applied to adder 28. The second input to this adder corresponds to "01" because of the fixed connections, and a sum of "10" with a "0" carry is generated. This "0" carry indicates that the highest-order bit of the square root bit is a "1" (as indicated). The "0" carry is also applied to condition an "and" gate 34 which supplies the sum "10" from adder 28 to the higher bit positions of the first input of the subsequent adder 26. The lower order bits of this input are "01" representing the complement of the appropriate radicand bits. The "0" carry output of adder 28 (corresponding to a square root output bit equal to "1") is directly applied as the highest-order bit of the second input to adder 26. The two lower-order bits of this input are "01" from the fixed connections. Adder 26 generates a sum "1110" with a "0" carry as indicated by the encircled notations. The "0" carry indicates that the second-highest-order bit of the square root is also a "1." In a similar manner, the sum generated by adder 26 is supplied as the higher-order bits of the first input to adder 24, and the appropriate complemented radicand bits are used as the lower-order entries. The lower-order bits of the second input to the adder 24 are "01" because of the fixed connections and the previously generated radicand bits "11" are used as the higher-order entries. Adder 24 generates a sum of "000110" with a "1" carry. This indicates that the corresponding square root bit is a "0" and that the generated sum is not to be applied to the subsequent adder. In this case, the "1" carry conditions "and" gate 36 which passes the first input of adder 24 to the higher-order positions of the first input of the lowest-order adder 22. This generates a sum of "11111111" and a "0" carry, indicating that the final (lowest-order) bit of the square root is "1" and that the root has been exactly determined.

The computer shown in block diagram of FIGURE 1 has been shown to generate the square root of the applied radicand according to the technique shown in the introductory examples. This computer requires no synchronization and fluctuations in the input radicand are continuously reflected in the generated square root.

The adders, selectors, and distributors shown in FIGURE 1 will now be described in detail with respect to a cryogenic embodiment and a neon-photoconductor embodiment.

A typical cryogenic adder of the type that may be used in this invention is shown in FIGURE 2. This adder accepts a four-bit addend, labelled "addend 1," applied on leads 50, and a three-bit addend, labelled "addend 2," applied on leads 52, and generates a five-bit sum on leads 54, where the highest-order bit of the sum is considered to be the carry bit referred to in the description with respect to the block diagram of FIGURE 1. This adder can obviously be modified to provide any desired bit capacity.

The adder shown in FIGURE 2 utilizes cryogenic elements which are called cryotrons. The cryotrons used in the present invention are devices having two current paths: an input or "control" path and an output or "gate" path. In operation, a current flows in the gate (output) path when no current is applied to the control (input) path. Thus, a cryotron may be considered as a logical inhibitor element. In FIGURE 2, each cryotron is shown by a rectangle with the gate current flowing in the leads connected to its ends and the control current flowing in the leads connected to its sides.

The lowest-order ($2^0$) addend input bits are applied to a group 56 of four cryotrons. The "addend 2" bit supplies the control current to the cryotrons and, in conjunction with the "addend 1" bit, determines the $2^0$ sum.

When the $2^0$ "addend 1" bit is "0," current flows in the path toward cryotrons 56–1 and 56–2 and the $2^0$ "addend 2" bit provides the control current to determine which of these two cryotrons has a gate current. When the $2^0$ "addend 2" bit is 0, cryotron 56–1 is inhibited and current flows through cryotron 56–2 to provide a "0" as the $2^0$ sum bit. When the $2^0$ "addend 2" bit is "1" (and the $2^0$ "addend 1" bit remains "0"), cryotron 56–2 is inhibited and current flows through cryotron 56–1 to provide a "1" as the $2^0$ sum bit. Similarly, a $2^0$ "addend 1" bit of "1" and a $2^0$ "addend 2" bit of "0" generates a "1" as the $2_0$ sum bit by current flow through cryotron 56–4. When both $2^0$ addend bits are "1," cryotron 56–3 passes current to provide a $2^0$ sum bit of "0." The current flowing from the group 56 of cryotrons is also used to control another group 58 of cryotrons which provide a carry signal when both $2^0$ addend bits are "1," as will be described below.

The $2^1$ addend bits are similarly applied to a group 60 of cryotrons whose operation is similar to the operation of group 56, but the output current from this group is further controlled by a group 62 of cryotrons before the $2^1$ sum bit is determined. This group 62, in conjunction with group 58, modify the $2^1$ sum bit to account for a $2^0$ carry bit of "1" when both $2^0$ addend bits are "1." In this case, cryotron 58–1 is inhibited and current flows through cryotrons 58–2 and 58–3 to inhibit cryotrons 62–1, 62–2 and 62–3, and uninhibited cryotrons 62–4, 62–5 and 62–6 have the effect of inverting the otherwise present $2^1$ sum output. When a $2^0$ carry of "0" is indicated (by gate current flow through cryotron 58–1), cryotrons 62–4, 62–5 and 62–6 are inhibited and uninhibited cryotrons 62–1, 62–2 and 62–3 pass the output of group 60 without alteration as the $2^1$ sum bit.

Similarly, groups 64 through 76 of cryotrons control the generation of the higher-order sum bits. The chart in FIGURE 3 indicates the operation of each cryotron in the adder in FIGURE 2 for all possible input addends. An "X" in this chart indicates that the associated cryotron is inhibited by a control current and a "$\surd$" indicates that a gate current is present.

A cryogenic embodiment of a selector circuit is shown in FIGURE 4. This circuit is suitable for use in the computer shown in FIGURE 1 in conjunction with the adder shown in FIGURE 2 and the distributor shown in FIGURE 5.

One of the two inputs (A and B) that are applied to the selector circuit shown in FIGURE 4 is chosen as the circuit output, where the selection is determined by the control signals: "Select A" and "Select B." Each input is shown to include two bits of data but the circuit may obviously be extended to operate on input data having any number of bits.

Input A is applied to a first cryogenic "and" gate 80 and input B is applied to a second cryogenic "and" gate 82. The "Select A" and "Select B" signals (corresponding to the carry output signals from the preceding adders shown in FIGURE 1) are also applied to the corresponding "and" gates 80, 82.

When a "Select A" current is applied to the circuit shown in FIGURE 4, a gate current flows through cryotron 80–1 or 80–2, depending upon the $2^0$ bit of the A input signal. When this bit is "0," cryotron 80–1 is inhibited and gate current flows through cryotron 80–2. Similarly, when the $2^0$ bit of A input signal is "1," gate current flows through cryotron 80–1. The gate current through cryotrons 80–1 and 80–2 is the control current for cryotrons 80–3 and 80–4. Thus, when the $2^0$ bit of A input signal is "0," cryotron 80–4 is inhibited and gate current flows through cryotron 80–3 to provide a "0" as the $2^0$ bit of the output signal. Similarly, when the $2^0$ bit of the A input signal is "1," gate current flows through cryotron 80–4 to provide a "1" output signal. In the same manner, the "Select A" control signal passes the $2^1$ bit of the A input signal as the $2^1$ bit of the output signal by the operation of cryotrons 80–5, 80–6, 80–7 and 80–8. Cryotrons 82–3, 82–4, 82–7 and 82–8 in "and" gate 82 have no effect on the output of "and" gate 80 when the A input signal is to be selected because there is no current applied to the "Select B" input and, hence, no current available to inhibit any of these cryotrons.

Similarly, cryotrons 82–1 through 82–8 in "and" gate 82 operate to choose the B input signal as the output signal when a "Select B" control signal is applied.

A cryogenic embodiment of a distributor circuit is shown in FIGURE 5. This circuit is suitable for use in the computer shown in FIGURE 1 in conjunction with the adder shown in FIGURE 2 and the selector shown in FIGURE 4. This circuit is used to provide a plurality of separate and identical signals where only one signal is available and is used in a cryogenic system to avoid splitting a current into several paths. In FIGURE 5, the single input signal on leads 84 is applied as a first output signal on leads 86 and as the control signal to cryotrons 88 to provide additional similar output signals on leads 90.

The detailed cryogenic circuits shown in FIGURES 2, 4 and 5 are typical circuits that may be used in a cryogenic embodiment of the computer shown in FIGURE 1. A second embodiment of this computer using neon-photoconductor elements is based on the block diagram of FIGURE 1 and the detailed diagrams of a typical adder shown in FIGURE 6 and a typical selector shown in FIGURE 8. A detailed diagram of a distributor circuit is not shown because the physical connections shown in the distributor blocks 40 in FIGURE 1 may be used in the neon-photoconductor embodiment.

In the circuits shown in FIGURES 6 and 8, solid lines are used to indicate electrical connections and dashed lines are used to indicate light paths. The photoconductor elements are indicated by rectangles having electrical connections at their ends and light applied at their sides. The photoconductor elements have a high impedance when no light is applied and a low impedance when light is applied. Thus, these elements act as gates, passing current when conditioned by light.

A typical adder shown in FIGURE 6 operates on a four-bit addend (addend 1) and a three-bit addend (addend 2) to generate a five-bit sum, where the highest-order ($2^4$) bit corresponds to the carry signal required in the computer in FIGURE 1. FIGURE 6*a* should be placed above FIGURE 6*b* to obtain the composite FIGURE 6. This typical adder can obviously be extended to operate on any number of addend bits.

In FIGURE 6, the $2^0$ addend 2 signal is applied to operate a corresponding neon lamp 102 or 104 which conditions the corresponding pair of photoconductor (PC) elements 103–1, 103–2 or 105–1, 105–2. The $2^0$ addend 1 signal is then passed to light one of three lamps 106, 107 and 108. When both $2^0$ addend bits equal "0," current flows through PC element 105–2 to light lamp 108. Similarly, when both $2^0$ addend bits equal "1," current flows through PC element 103–1 to light lamp 106. When one addend bit is "0," and the other is "1," current flows through PC element 103–2 or 105–1 to light lamp 107. In the first two cases (0+0 or 1+1), light is applied from a neon lamp 108 or 106 respectively to condition a PC element 112, which provides a $2^0$ output sum bit of "0." In the third case (0+1 or 1+0), light from lamp 107 conditions a PC element 114, which provides a $2^0$ output bit of "1."

The $2^1$ addend bits are applied to a similar circuit comprising neon lamps 116 and 118 and PC elements 120–1, 120–2, 122–1 and 122–2, but the output of this circuit is applied to two groups of PC elements 124 and 126. PC elements 124 are conditioned by light from lamp 106 when both $2^0$ addend bits are "1," indicating a $2^0$ carry of "1." For all other combinations of $2^0$ addend bits (0+0, 0+1 or 1+0), a $2^0$ carry of "0" is present and PC elements 126 are conditioned. In the latter case ($2^0$ carry of "0") one of a group of neon lamps 128, 130 and 132 is lighted and a PC element 136 or 138 is conditioned to provide a $2^1$ output sum bit in the manner described for the $2^0$ bit addition. However, when a $2^0$ carry of "1" is indicated, PC elements 124 are operated and have the effect of shifting the position of the lighted lamp. That is with a $2^0$ carry equal to "1" and with $2^1$ addend bits both equal to "0," lamp 130 is lighted (instead of lamp 132 which is lighted when both $2^1$ bits equal "0" and the $2^0$ carry is "0"). Similarly, with a $2^0$ carry equal to "1" and with one $2^1$ addend bit equal to "1" and the other $2^1$ addend bit equal to "0," lamp 128 (instead of lamp 130 in the "0" carry case), is lighted; and with a $2^0$ carry of "1" and with $2^1$ addend bits that are both "1," lamp 134 (instead of lamp 128 in the "0" carry case) is lighted. Thus, a $2^1$ output sum of "0" is indicated for a $2^0$ carry of 0 and $2^1$ addend bits that are both "0" or both "1," or for a $2^0$ carry bit of "1" with one $2^1$ addend bit of "1" and one $2^1$ addend bit of "0."

The operation of the adder shown in FIGURE 6 for all possible addends, is outlined in the chart in FIGURE 7 where a "$\sqrt{}$" indicates a lighted neon lamp.

This chart should be referred to in conjunction with the dashed-line light paths shown in FIGURE 6 for an indication of the status of the PC elements for any pair of addends.

A selector circuit suitable for use in a neon-photoconductor embodiment of the invention is shown in FIGURE 8.

One of the two inputs (A and B) that are applied to the selector circuit is chosen as the circuit output, where the selection is determined by the control signals: "Select A" and "Select B." Each input is shown to include two bits of data but the circuit may obviously be extended to operate on input data having any number of bits. Each lead corresponding to input A is applied to a PC element 176 and each lead corresponding to input B is applied to a PC element 178. When a "Select A" control signal is present, a neon lamp 180 is lighted, conditioning its associated PC elements 176 which then pass the input A data as the circuit output. Similarly, when a "Select B" control signal is applied to light neon lamp 182, PC elements 178 are conditioned and the input B data is passed as the circuit output.

Two embodiments of a square root computer have been shown and described in detail. These embodiments are examples of a computing technique that requires no synchronization. This technique makes use of a group of devices for linearly combining a plurality of signals (such as a group of adders) where a portion of the computer input data is applied as one input to each device and where a second input to each device is responsive to the output of the device which has the next higher order input data applied. This technique provides an output which is continuously responsive to the computer input whether it be constant or changing. This computing technique is especially useful in solving that class of problems which lend themselves to an iterative process of converging approximations, such as problems involving division, square roots, cube roots and high-order roots. Thus, this technique is also ideally suited for operating with continued fractions, such as:

$$\cfrac{1}{1+\cfrac{a}{1+b}{1+\ldots}}$$

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer for generating an indication of the square root of an *n*th-order radicand comprising, in combination:

a plurality of *m* unsynchronized linear combination circuits, each corresponding to an order of the *m*th-order square root of the radicand and each for generating a first and a second output, where each output is indicative of a function of a linear combination of a plurality of applied multiple-order digit representations and where the first output is also indicative of a function of the corresponding digit of the square root;

means for establishing, as one of the plurality of multiple-order digit representations in the $m$th-order circuit, the $n$th-order and $(n-1)$-order digits of the radicand as the second-order and first-order representations respectively when $n$ is an even number, and the $n$th-order digit of the radicand as the first-order representation when $n$ is an odd number;

means for establishing, as the first-order and second-order digit representations of one of the plurality of multiple-order digit representations in the successively lower-order circuits, the successively lower-order pairs of digits of the radicand, where the higher-order digit of each pair of radicand digits is established as the second-order digit representation and the lower-order digit of each pair of radicand digits is established as the first-order digit representation, in each circuit;

selector means responsive to the first output of the next higher-order circuit for establishing, as the remaining digits of the said one of the plurality of multiple-order digit representations in each circuit except for the circuit corresponding to the $m$th-order digit of the square root, the digits established in the said one of the plurality of multiple-order digit representations in the next higher-order circuit when said first output of the next higher-order circuit assumes a first value and said second output of the next higher-order circuit when said first output of the next higher-order circuit assumes a second value, and where each digit thus established in said remaining portions is established in the order that is two greater than its corresponding order in said next higher-order circuit;

and means for establishing, as a second of the plurality of multiple-order digit representations in each circuit except for the circuit that corresponds to the $m$th-order of the square root, a function of said first outputs of all higher-order circuits.

2. A computer for operating multi-order input data for generating multi-order output data comprising, in combination:

a plurality of unsynchronized arithmetic devices, one corresponding to each order of the computer output data and each for operating on a plurality of multi-order input signals to provide a multi-order output signal determinative of an order of the computer output data;

means for applying at least one order of the computer input data as an input signal to each arithmetic device;

a plurality of selector means, one corresponding to each order except for the lowest-order of the computer output data, and each responsive to both an input signal and to an output signal from the corresponding arithmetic device, for generating a multi-order selector signal;

and means for applying each multi-order selector signal as a second input to the arithmetic device corresponding to the next lower-order of the computer output data.

3. A computer for operating on multi-order input data for generating multi-order output data comprising, in combination:

a plurality of unsynchronized arithmetic devices, each corresponding to an order of the computer output data and each for linearly combining a first multi-order input function and a second multi-order input function to provide an output function determinative of the data in an order of the computer output data;

means for applying at least one order of the computer input data to each arithmetic device to form at least a portion of the first multi-order input function to that device;

a plurality of selector means, one corresponding to each order, except for the lowest-order of the computer output data and each responsive to the first input function and the output function of the corresponding arithmetic device for generating a multi-order selector output function;

function and the output function of the corresponding arithmetic device for generating a multi-order selector output function;

and means for applying each multi-order selector output function to the arithmetic device corresponding to the next lower-order of the computer output data as a portion of its first multi-order input function.

4. A computer for generating an indication of the square root of an $n$th-order binary radicand comprising, in combination:

a plurality of $m$ unsynchronized binary adder circuits, each corresponding to an order of the $m$th-order square root of the radicand, each for operating on two multiple-bit addends, and each for generating an output comprising a carry representation and a multiple-bit sum representation;

means for establishing, as the first addend in the $m$th-order adder circuit, the complement of the $n$th-order and $(n-1)$-order bits of the radicand as the second-order and first-order addend bits respectively when $n$ is an even number, and the complement of the $n$th-order bit of the radicand as the first-order addend bit when $n$ is an odd number;

means for establishing, as the first-order and second-order bits of the first addend in the successively lower-order adder circuits, the complements of the successively lower-order pairs of bits of the radicand, where the complement of the higher-order bit of each pair of radicand bits is established as the second-order bit and the complement of the lower-order bit of each pair of radicand bits is established as the first-order bit in each adder circuit;

a plurality of selector circuits, each responsive to the carry output of the next higher-order adder circuit and each for establishing, as the remaining bits of the first addend in each adder circuit except for the adder circuit corresponding to the $m$th-order digit of the square root, the first addend of the next higher-order adder when the carry representation of the next higher-order adder circuit assumes a first value and the sum representation of the next higher-order adder circuit when the carry representation of the next higher-order circuit assumes a second value, and where each bit thus established is established in the order that is two greater than its corresponding order in the next higher-order circuit;

means for establishing as the bits of the second addend in the $m$th adder circuit, the bits 01;

means for establishing as the lowest-order bits of the second addend in all adder circuits, except the $m$th adder circuit, the bits 01;

and means for establishing, as the sequentially higher-order bits of the second addend in all adder circuits, except the $m$th adder circuit, the complements of the carry representations from the higher-order adder circuits in sequence beginning with the complement of the carry representation from the adjacent, higher-order adder circuit;

whereby the bits of the square root of the radicand are indicated by the complements of the carry representations of the corresponding adder circuits.

5. The apparatus as described in claim 4, where the adder circuits and selector circuits are comprised of cryogenic elements.

6. The apparatus as described in claim 4, where the adder circuits and selector circuits are comprised of neon-photoconductor elements.

7. A computer for operating multi-order input data for generating multi-order output data comprising, in combination:

a plurality of unsynchronized arithmetic devices, one corresponding to each order of the computer output data and each for operating on a plurality of multi-order input signals to provide a multi-order output signal determinative of an order of the computer output data;

means for applying at least one order of the computer input data as an input signal to each arithmetic device;

means for applying an iterative data input signal as a second input signal to each arithmetic device;

a plurality of selector means, one corresponding to each order except for the lowest-order of the computer output data, and each responsive to both an input signal and to an output signal from the corresponding arithmetic device, for generating a multi-order selector signal;

and means for applying each multi-order selector signal as a second input to the arithmetic device corresponding to the next lower-order of the computer output data.

8. A computer for operating on multi-order input data for generating multi-order output data comprising, in combination:

a plurality of unsynchronized arithmetic devices, each corresponding to an order of the computer output data and each for linearly combining a first multi-order input function and a second multi-order input function to provide an output function determinative of the data in an order of the computer output data;

means for applying at least one order of the computer input data to each arithmetic device to form at least a portion of the first multi-order input function to that device;

means for applying an iterative data input signal to each arithmetic device to form at least a portion of the second multi-order input function to that device;

a plurality of selector means, one corresponding to each order, except for the lowest-order of the computer output data and each responsive to the first input function and the output function of the corresponding arithmetic device for generating a multi-order selector output function;

and means for applying each multi-order selector output function to the arithmetic device corresponding to the next lower-order of the computer output data as a portion of its first multi-order input function.

References Cited by the Examiner

UNITED STATES PATENTS

| | | | |
|---|---|---|---|
| 2,888,200 | 5/1959 | Weiss | 235—158 |
| 2,936,380 | 5/1960 | Anderson | 235—176 X |
| 3,001,709 | 9/1961 | Trussell | 235—158 |
| 3,004,705 | 10/1961 | Bremer | 235—164 |
| 3,141,964 | 7/1964 | Fleisher | 235—175 |

ROBERT C. BAILEY, *Primary Examiner.*

DARYL W. COOK, *Examiner.*